United States Patent [19]

Sasaki et al.

[11] Patent Number: 4,562,131
[45] Date of Patent: Dec. 31, 1985

[54] PHOTORECEPTOR CONTAINING A TRISAZO COMPOUND FOR USE IN ELECTROPHOTOGRAPHY

[75] Inventors: Osamu Sasaki; Naohiro Hirose, both of Hachioji; Kiyoshi Sawada, Hino, all of Japan

[73] Assignee: Konishiroku Photo Industry Co., Ltd., Tokyo, Japan

[21] Appl. No.: 607,200

[22] Filed: May 4, 1984

[30] Foreign Application Priority Data

May 6, 1983 [JP] Japan .................................. 58-79607

[51] Int. Cl.$^4$ ............................................... G03G 5/06
[52] U.S. Cl. ........................................ 430/58; 430/73; 430/75; 430/76
[58] Field of Search ......................... 430/73, 75, 76, 58

[56] References Cited

U.S. PATENT DOCUMENTS 4,436,800 3/1984 Ohta et al. ............................. 430/73
4,465,857 8/1984 Neumann et al. ..................... 430/73

*Primary Examiner*—John L. Goodrow
*Attorney, Agent, or Firm*—Jordan B. Bierman

[57] ABSTRACT

A photoreceptor is disclosed which comprises a photosensitive layer and an electrically conductive support. Said photosensitive layer contains a carrier generation material and a carrier transport material, said carrier generation material being a trisazo compound of the present invention, or said photosensitive layer may consist of a carrier generation layer containing said trisazo compound and a carrier transport layer containing said carrier transport material with or without an intermediate layer being provided between said support and said photosensitive layer.

14 Claims, 6 Drawing Figures

PHOTORECEPTOR CONTAINING A TRISAZO COMPOUND FOR USE IN ELECTROPHOTOGRAPHY

BACKGROUND OF THE INVENTION

1. Field of the Invention

The present invention relates to a photoreceptor for use in electrophotography, and more particularly, to a photoreceptor for use in electrophotography which contains a trisazo compound.

2. Description of the Prior Art

Inorganic photoconductors such as selenium, zinc oxide and cadmium oxide have been extensively used as the principal component of the photosensitive layer of common photoreceptors for use in electrophotography. However, these inorganic photoconductors are not fully satisfactory in respect to photosensitivity, heat resistance and cycle life and so on.

Organic photoconductors are recently gaining the interest of researchers as an alternative to the inorganic photoconductors. Photoreceptors having the photosensitive layer which contains an organic photoconductor as the principal component can be manufactured fairly easily and at low cost; they can be shaped into any desired form such as a cylindrical drum or sheet; they are easy to handle and have high resistance to heat. Despite these advantages, a photoreceptor that has so far been commercialized such as the one having a photosensitive layer containing as the principal component a charge transfer complex formed of poly-N-vinylcarbazole and a Lewis acid such as 2,4,7-trinitro-9-fluorenone does not have fully satisfactory characteristics with respect to photosensitivity and cycle life.

A new approach has been taken by using two different materials that are involved in the mechanism of photoconductivity, i.e. the carrier generator material and the carrier transport material. "Function separated" photoreceptors, so called in the art which use this idea have a great latitude for the selection of materials capable of either generating or transporting charges, are fairly easy to accomplish high performance in respect to electrophotographic characteristics (e.g. charging properties, sensitivity and residual potential) and cycle life, and are adapted to the manufacture of products having any desired characteristics.

Various inorganic and organic compounds have been proposed for use as the carrier generation material. Among the inorganic carrier generation materials, amorphous selenium is well known but its performance is deteriorated under elevated temperatures due to crystallization. While many photoconductive organic dyes and pigments have been proposed, azo compounds are well known and are shown in many prior art references such as Japanese Patent Applications (OPI) Nos. 37543/2, 95033/78, 133445/78, 69148/80, 20045/82 and 205747/82 (the symbol OPI as used herein means as unexamined published Japanese patent application). However, these azo compounds are not completely satisfactory in respect to sensitivity, residual potential and stability to cyclic operation. As another disadvantage, the azo compounds do not have a great freedom in selecting a suitable carrier transport material. Therefore, none of the inorganic and organic compounds that have been previously proposed for use as the carrier generation and transport materials completely satisfy the broad spectrum of requirements of electrophotographic processing.

Gas lasers such as Ar laser and He-Ne laser, as well as semiconductor lasers have been proposed for use as light sources for image illumination of the photoreceptor. These lasers can be switched on and off by electronic means, permit high-speed high-resolution recording and are adapted to various types of recording. For these advantages, the lasers are gaining interest for use as light sources with intelligent copiers and other copying machines having video processing capabilities, as well as printers used as output devices for computers. Semiconductor lasers are of special interest because of their unique features such as the elimination of electro-to-optic converters like acoustic photocouplers, and the possibility of significant size and weight reduction. However, the semiconductor lasers produce a lower output power than gas lasers and the wavelength range of their operation is at too longer a side ($\geqq$ca. 780 nm) to be used as light sources for the conventional photoreceptors having a shorter range of spectral sensitivities.

SUMMARY OF THE INVENTION

One object of the present invention is to provide a photoreceptor for use in electrophotography that contains a trisazo compound which is stable against both heat and light and which exhibits excellent carrier generating ability.

Another object of the present invention is to provide a photoreceptor for use in electrophotography that has high sensitivity and low residual potential and which is highly durable in that these desired properties will not change after repeated operation.

A further object of the present invention is to provide a photoreceptor for use in electrophotography that contains a trisazo compound that can be combined with a variety of carrier transport materials and will work effectively as the carrier generation material.

A still further object of the present invention is to provide a photoreceptor for use in electrophotography that has a satisfactory practical sensitivity to illuminations having a long wavelength range such as those issued from semiconductor lasers.

The trisazo compounds of formula (I) component of a photoreceptor of the present invention,

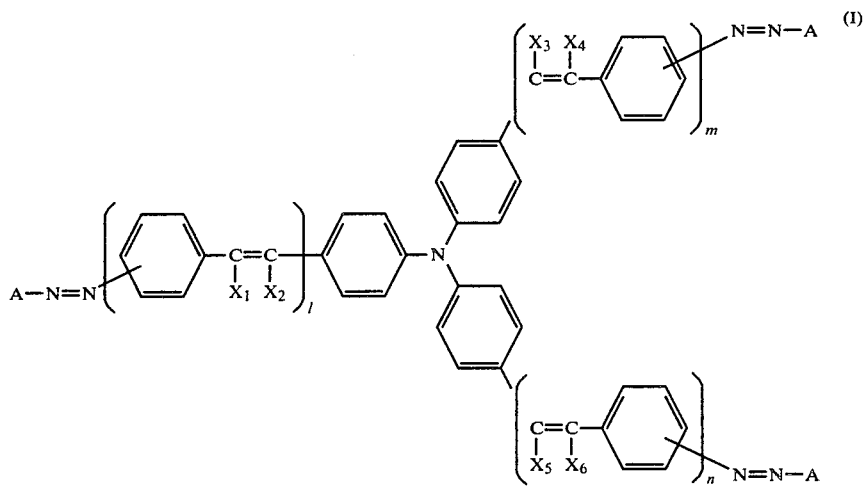

wherein $X_1$, $X_2$, $X_3$, $X_4$, $X_5$ and $X_6$ are each a hydrogen atom, a halogen atom or a cyano group; l, m and n are each 0 or 1, provided that at least one of l, m and n is 1; A is

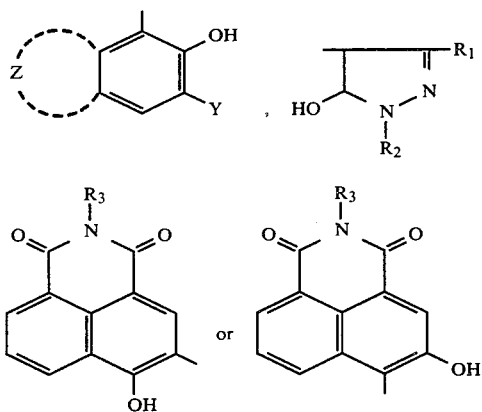

(wherein Y is a hydrogen atom, a hydroxyl group, a carboxyl group or an ester group thereof, a sulfo group, a substituted or unsubstituted carbamoyl group, a substituted or unsubstituted sulfamoyl group, preferably a substituted or unsubstituted carbamoyl group of the formula

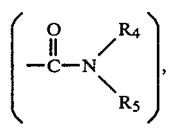

or a substituted or unsubstituted sulfamoyl group of the formula

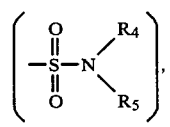

wherein $R_4$ is a hydrogen atom, a substituted or unsubstituted lower alkyl group having 1 to 4 carbon atoms, or a substituted or unsubstituted phenyl group; $R_5$ is a hydrogen atom, a substituted or unsubstituted lower alkyl group having 1 to 4 carbon atoms, a substituted or unsubstituted aromatic group (e.g. substituted or unsubstituted phenyl group, substituted or unsubstituted naphthyl group or substituted or unsubstituted anthryl group), or a substituted or unsubstituted aromatic heterocyclic group (e.g. substituted or unsubstituted carbazolyl group or substituted or unsubstituted dibenzofuryl group), illustrative substituents being selected from among an alkyl group having 1 to 4 carbon atoms, a halogen atom such as chlorine or bromine, a lower alkoxy group having 1 to 4 carbon atoms, a hydroxy group, an aryloxy group such as phenoxy or naphthoxy group, an acyloxy group, a carboxy group or an ester group thereof, a carbamoyl group, an acyl group, a sulfo group, a sulfamoyl group, an amino group, an acylamino group, a sulfonamido group, a cyano group or a nitro group, with an alkyl group having 1 to 4 carbon atoms, a halogen atom such as chlorine or bromine, a lower alkoxy group having 1 to 4 carbon atoms, a cyano group and a nitro group being preferred; Z is the atomic group necessary for constituting a substituted or unsubstituted aromatic carbon ring or a substituted or unsubstituted aromatic heterocyclic ring, with specific examples being a substituted or unsubstituted benzene ring, a substituted or unsubstituted naphthalene ring, a substituted or unsubstituted indole ring, and a substituted or unsubstituted carbazole ring, provided that the atomic groups forming these rings may be substituted by those which are listed as substituents for $R_4$ and $R_5$, with a halogen atom, a sulfo group and a sulfamoyl group being preferred; $R_1$ is a hydrogen atom, a substituted or unsubstituted alkyl group, a substituted or unsubstituted amino group, a carboxy group or an ester group thereof, a substituted or unsubstituted carbamoyl group or a cyano group, with a hydrogen atom, an alkyl group having 1 to 4 carbon atoms and a cyano group being preferred; $R_2$ is a substituted or unsubstituted aryl group, with a substituted or unsubstituted phenyl group being preferred, provided that $R_1$ and $R_2$ may be substituted by those which are listed as substituents for $R_4$ and $R_5$, with a halogen atom, an alkyl group having 1 to 4 carbon atoms, and a lower alkoxy group having 1 to 4 carbon atoms being preferred; and $R_3$ is a substituted or unsubstituted alkyl group, a substituted or unsubstituted aralkyl group or a substituted or unsubstituted aryl group, with an alkyl group having 1 to 4 carbon atoms and a phenyl group being preferred.)

According to the present invention, the trisazo compound of formula (I) is used as the photoconductive material in the photo-sensitive layer of a photoreceptor for use in electrophotography. Alternatively, this trisazo compound, having excellent carrier generating ability, is used as the carrier generation material in a "function separated" photoreceptor. By so doing, a photoreceptor having high stability against heat and light, good electrophotographic properties with respect to charging characteristics, sensitivity and residual potential, long cycle life, and a sufficient sensitivity to light sources having a long wavelength range can be produced.

DESCRIPTION OF THE PREFERRED EMBODIMENTS

Figure 1:
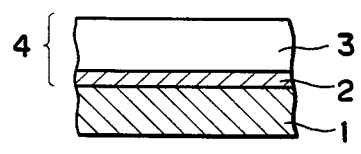
FIGS. 1 to 6 are cross sections of layer arrangements that can be used with the photoreceptor of the present invention.

The trisazo compounds of formula (I) which are effective for use in the present invention are illustrated by the following examples, to which the scope of the present invention is by no means limited.

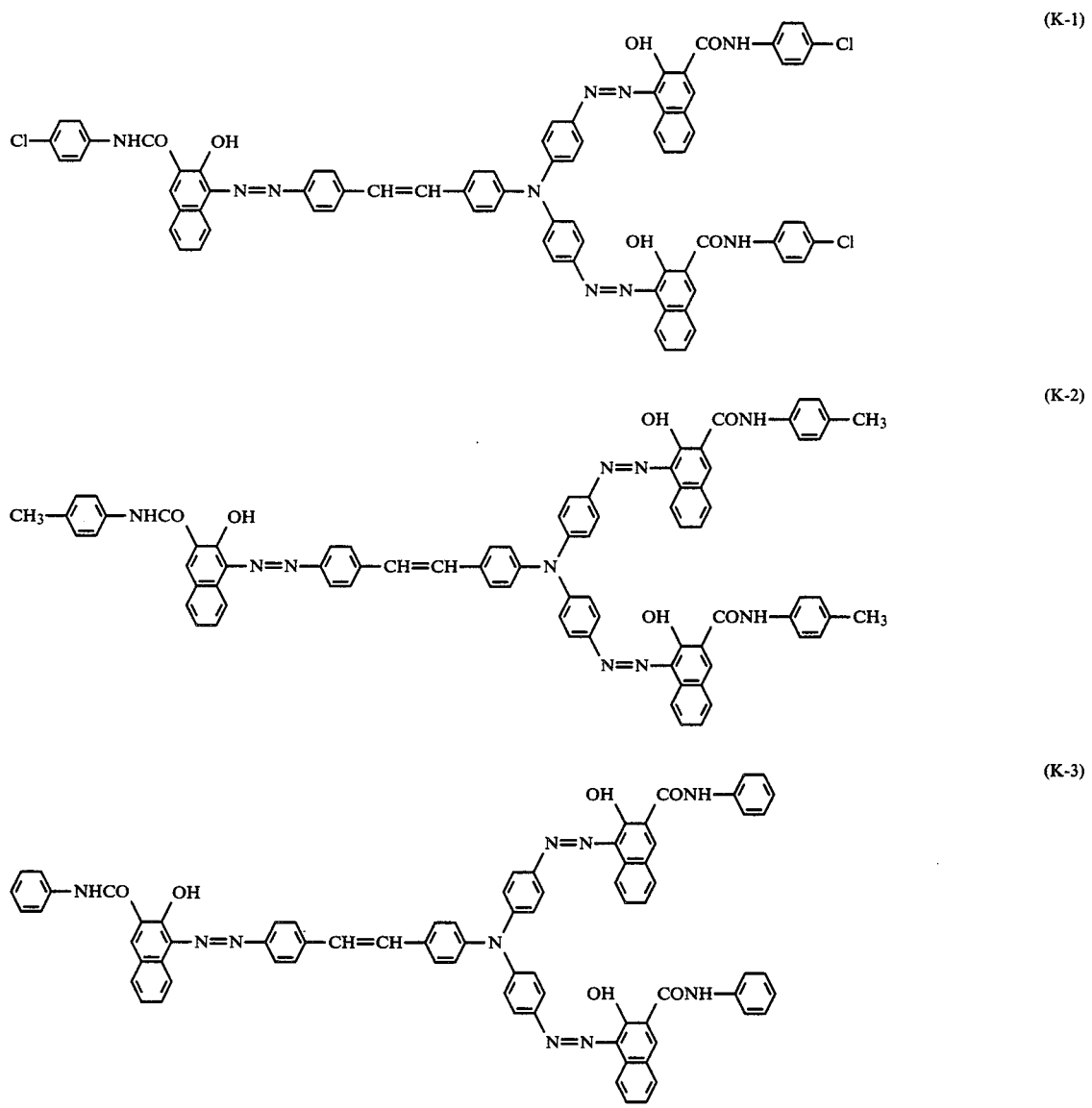

-continued
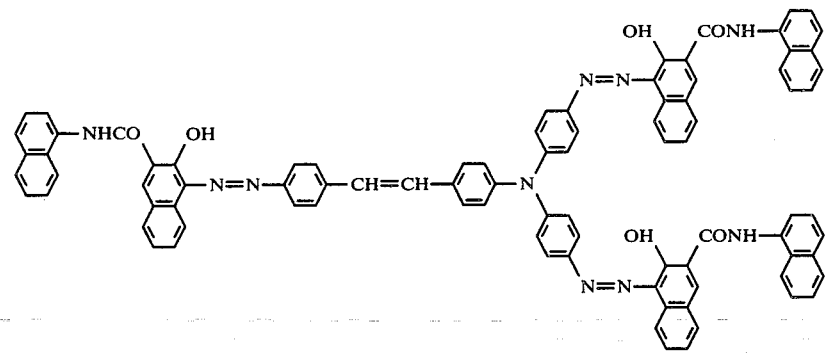
(K-4)
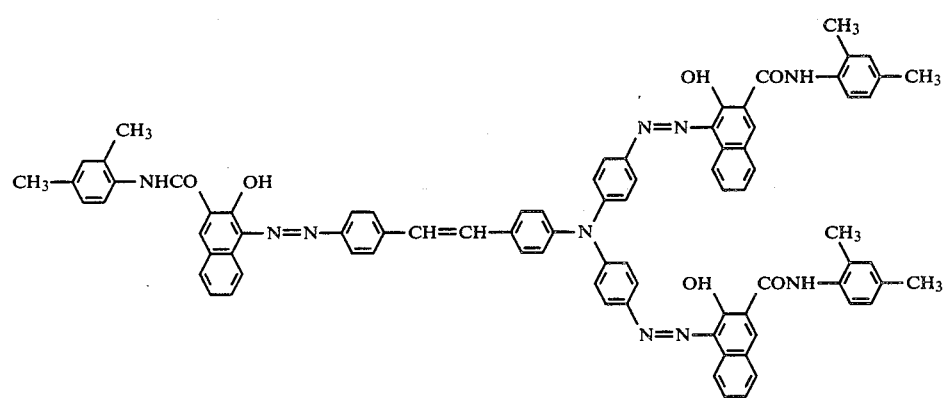
(K-5)
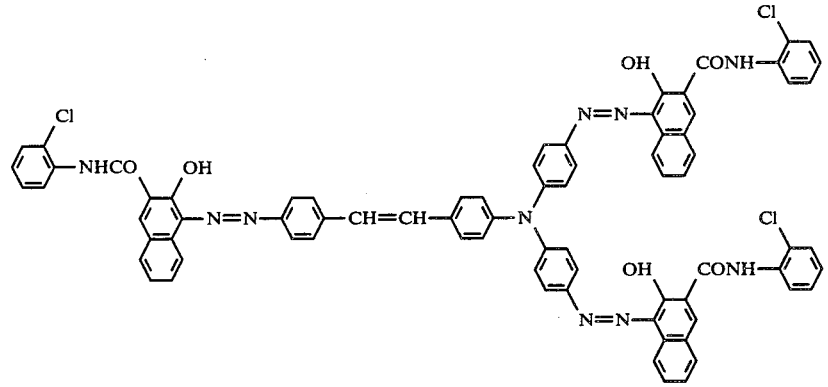
(K-6)
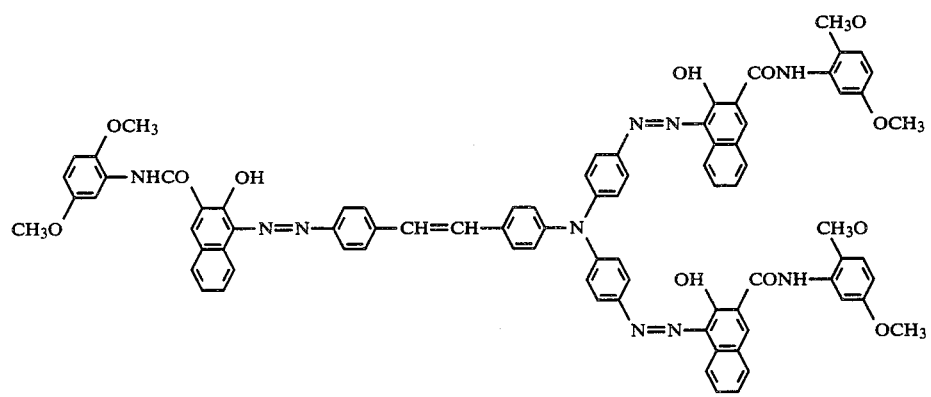
(K-7)

-continued
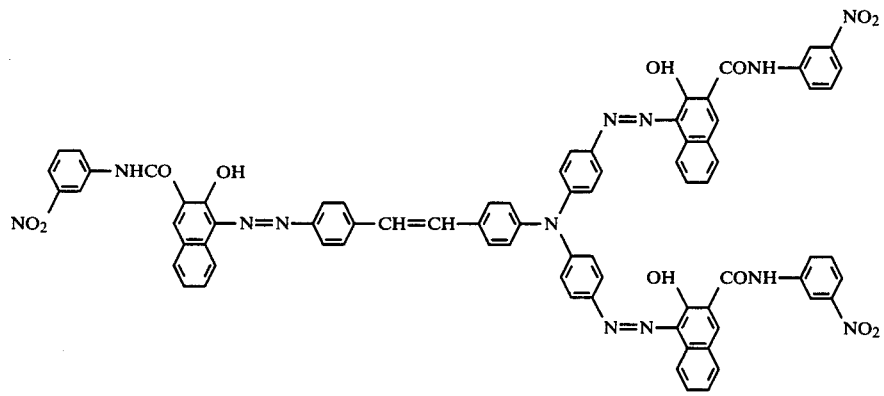
(K-8)
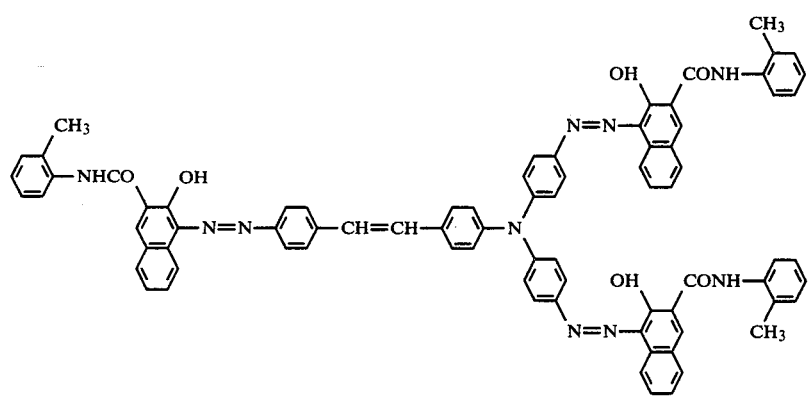
(K-9)
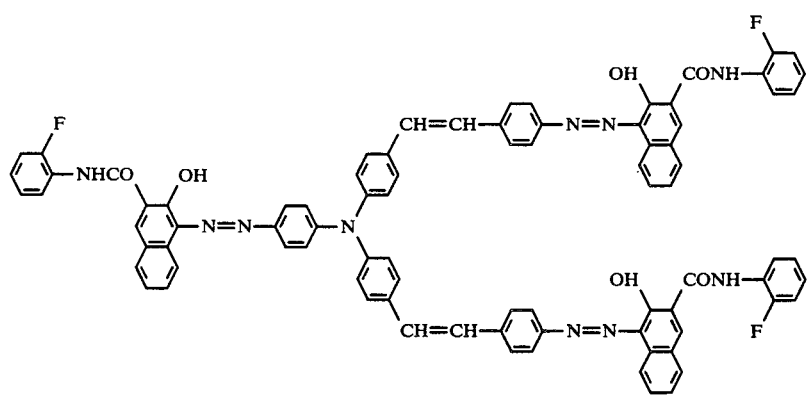
(K-10)
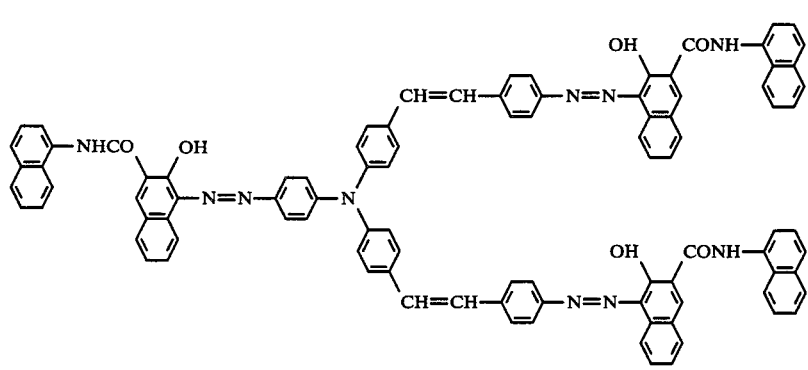
(K-11)

-continued
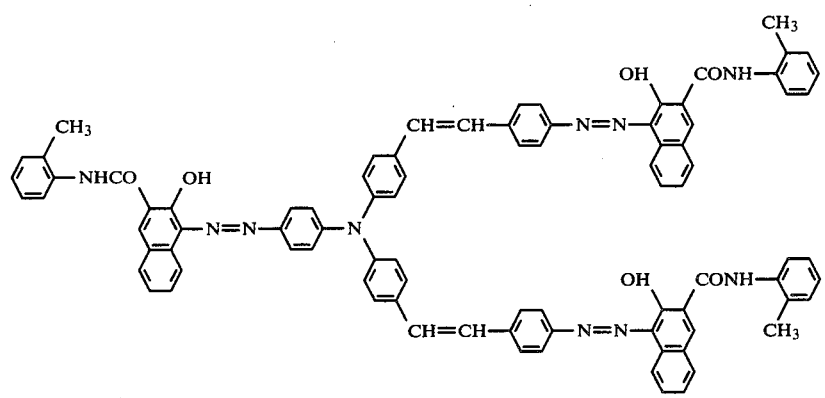
(K-12)
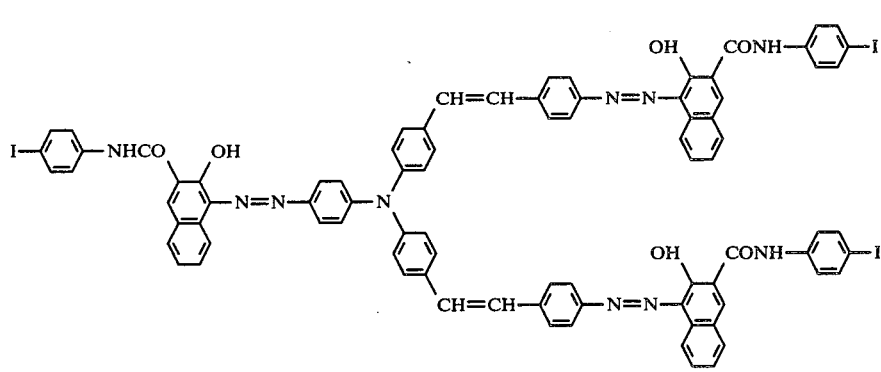
(K-13)
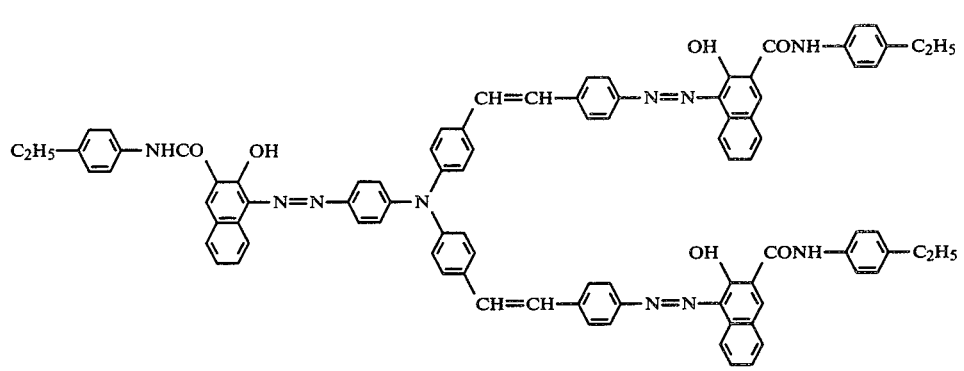
(K-14)
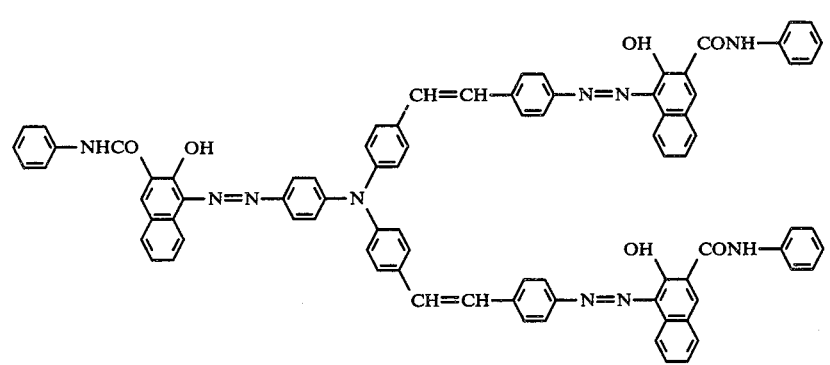
(K-15)

-continued
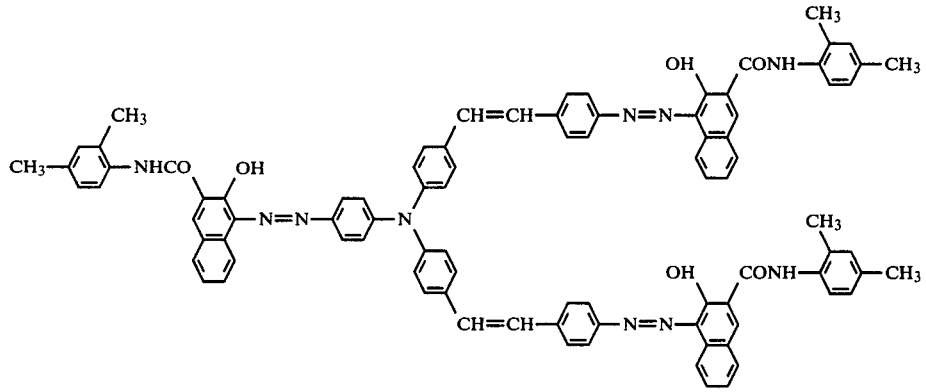
(K-16)
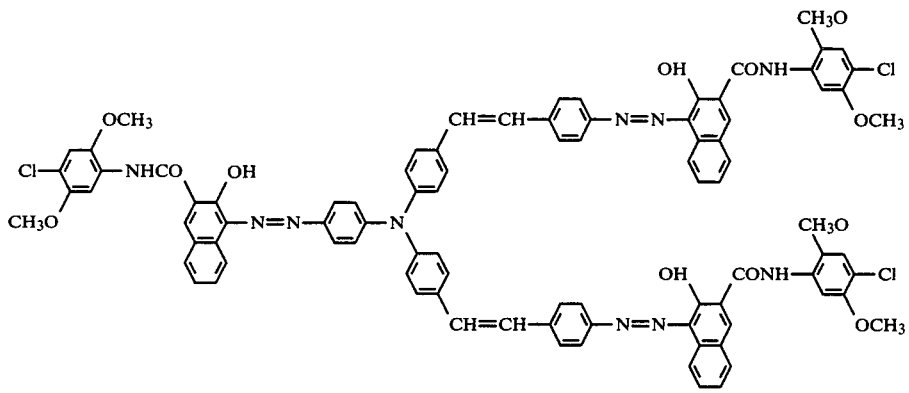
(K-17)
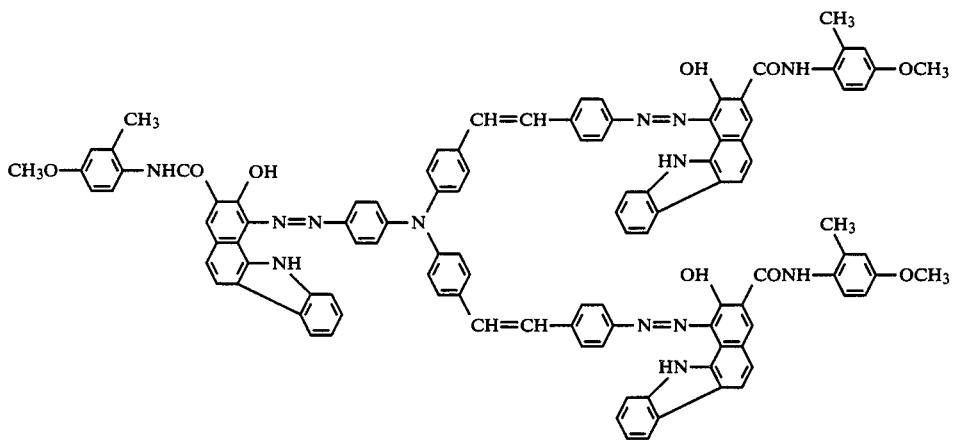
(K-18)
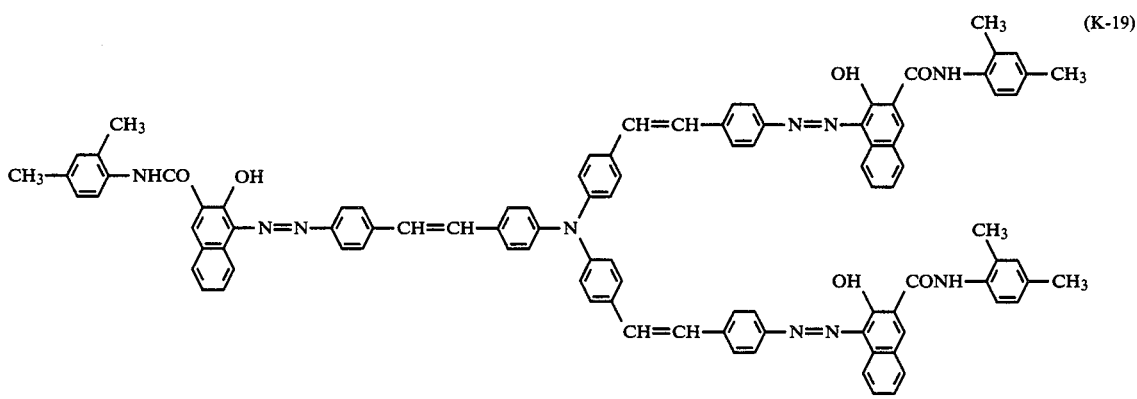
(K-19)

-continued
(K-20)
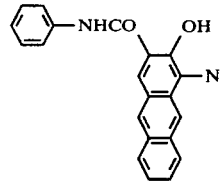 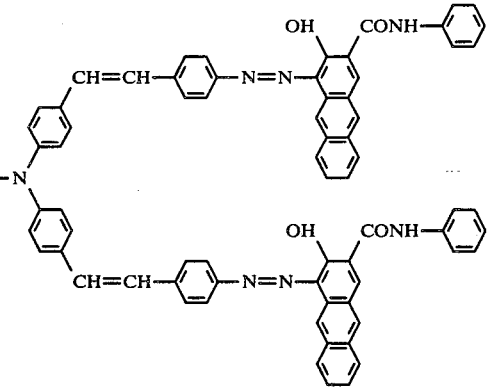
(K-21)
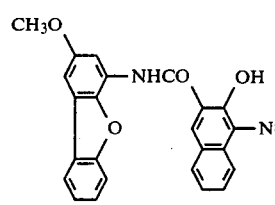 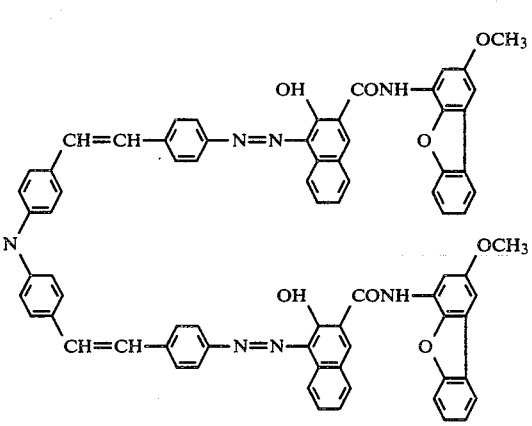
(K-22)
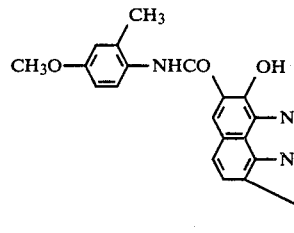 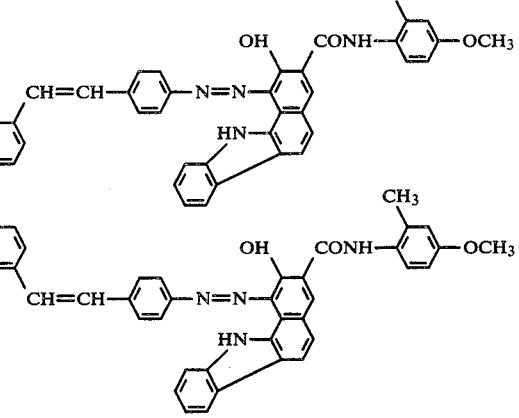
(K-23)
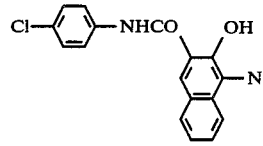 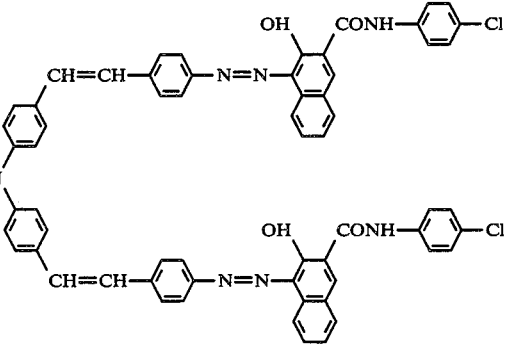

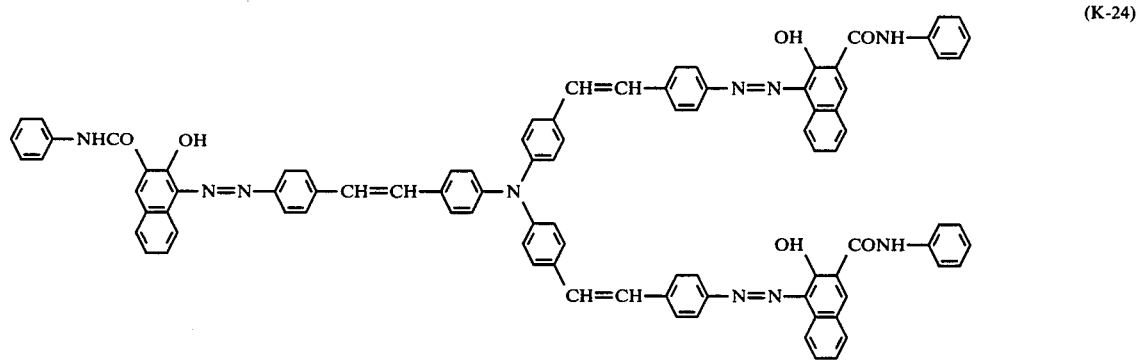
(K-24)
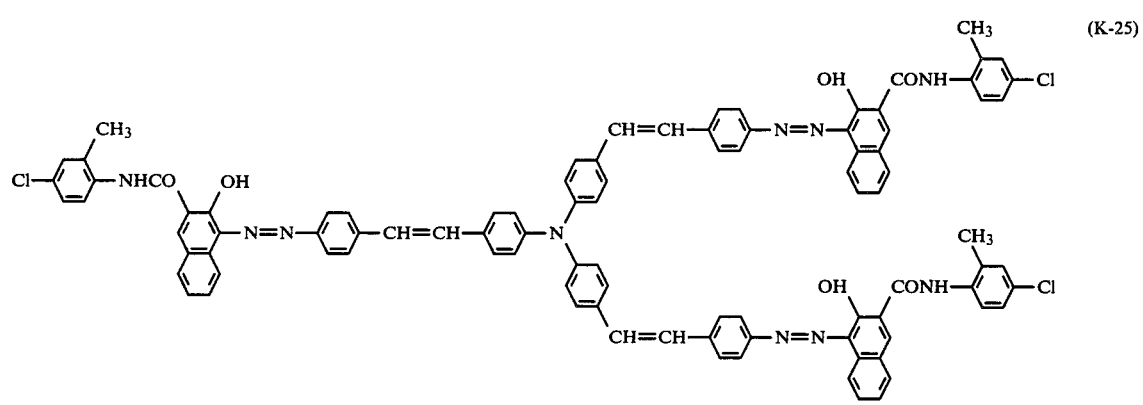
(K-25)
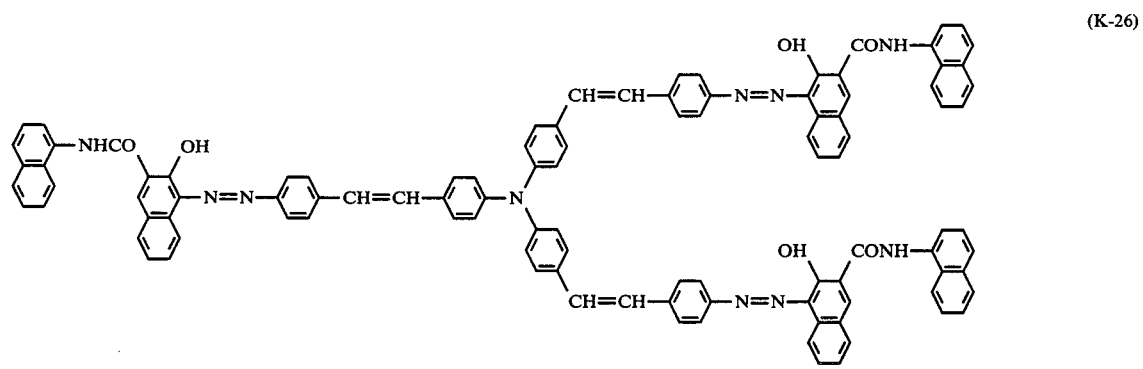
(K-26)
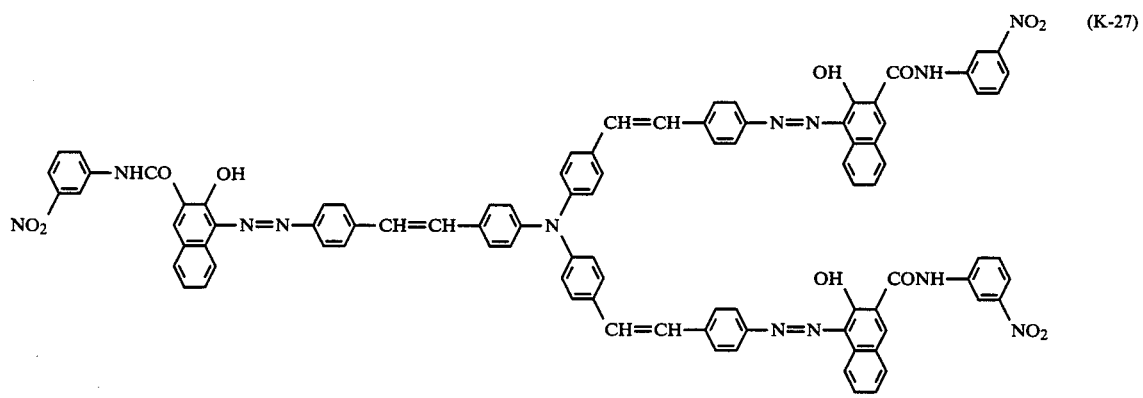
(K-27)

-continued
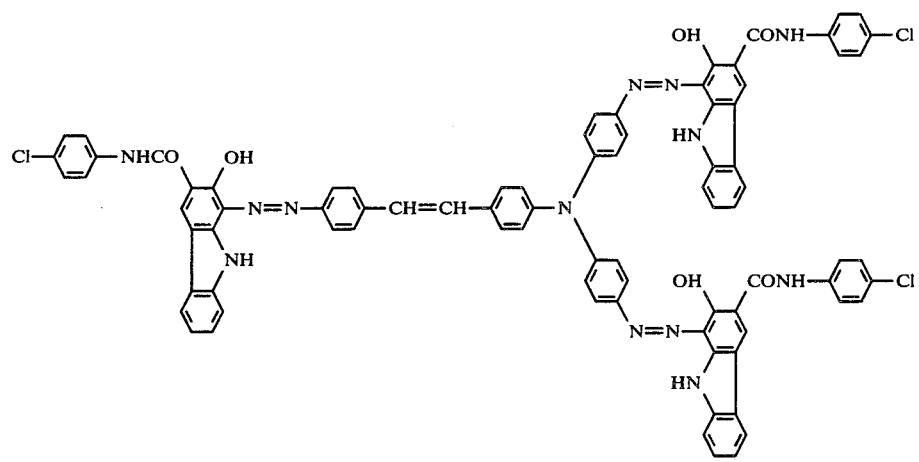
(K-28)
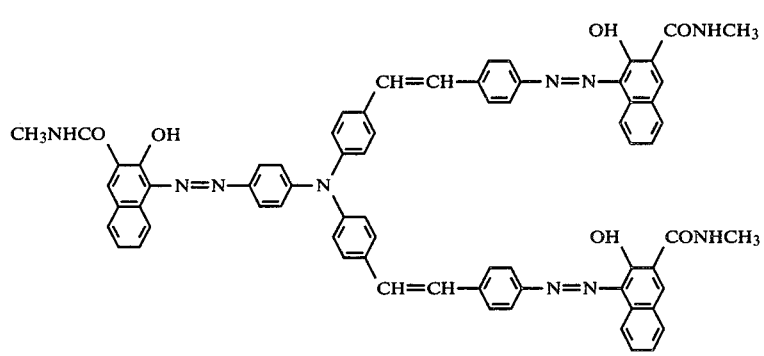
(K-29)
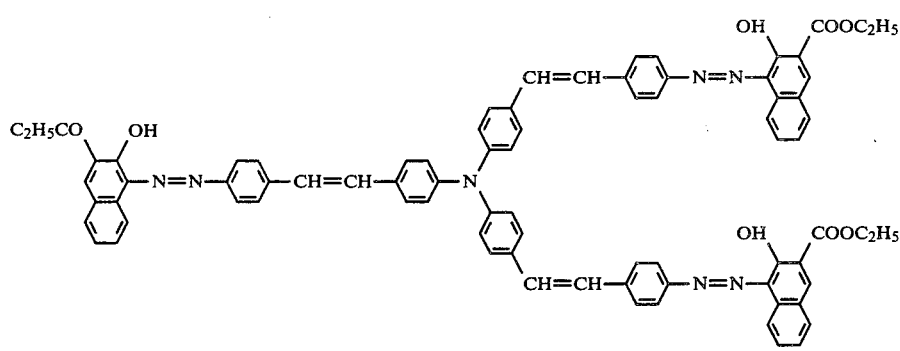
(K-30)
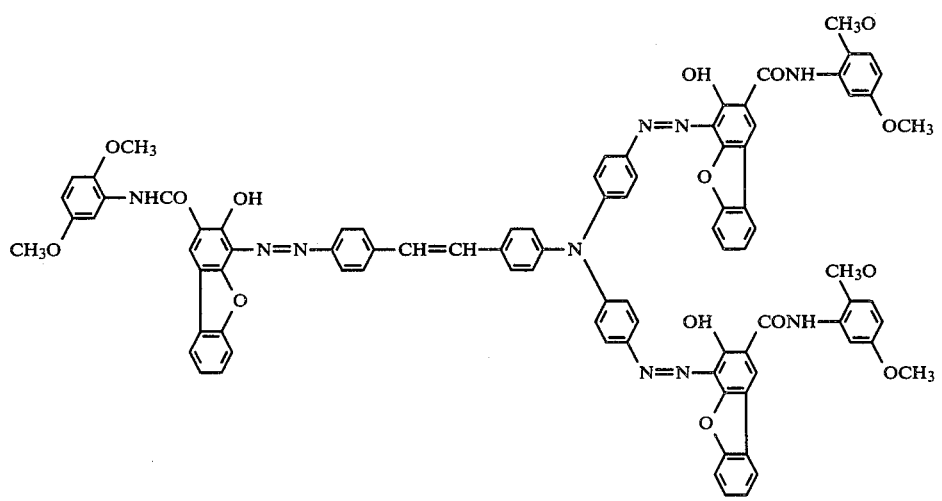
(K-31)

-continued
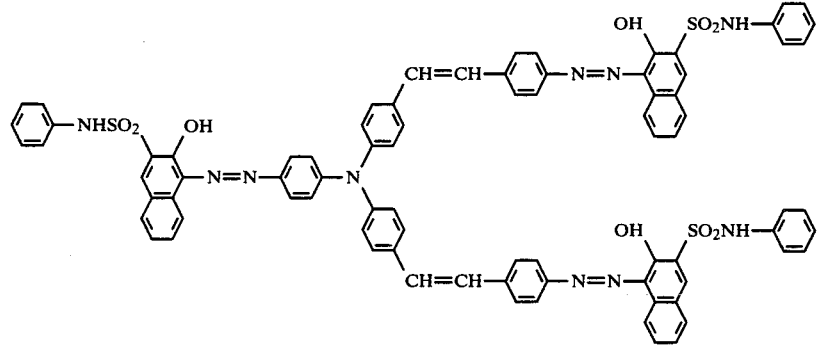
(K-32)
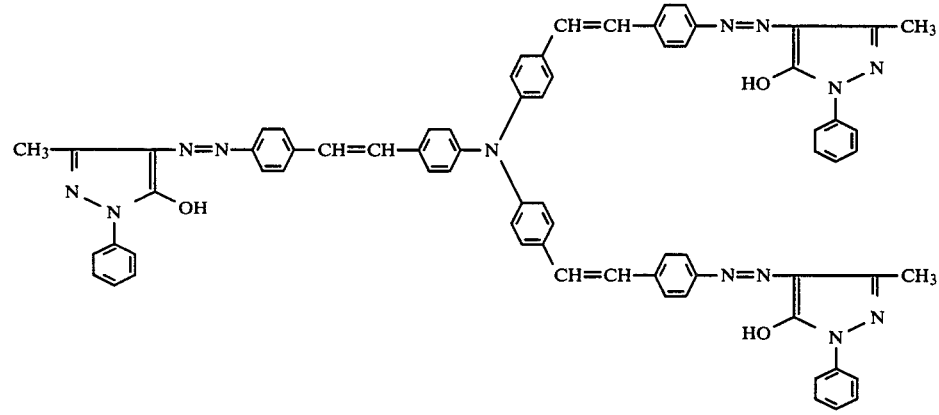
(K-33)
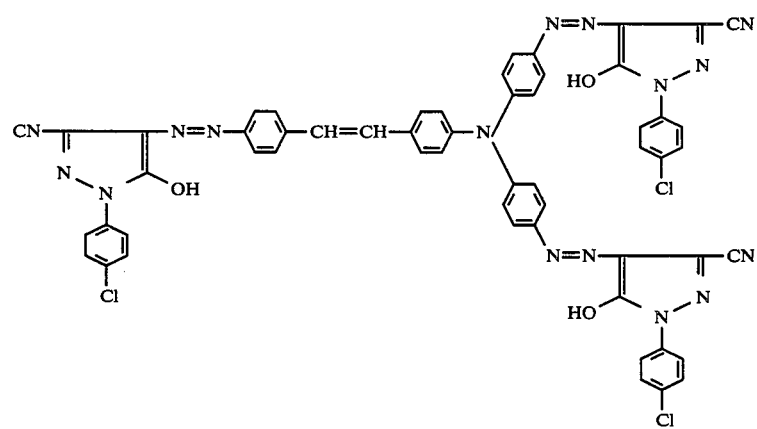
(K-34)

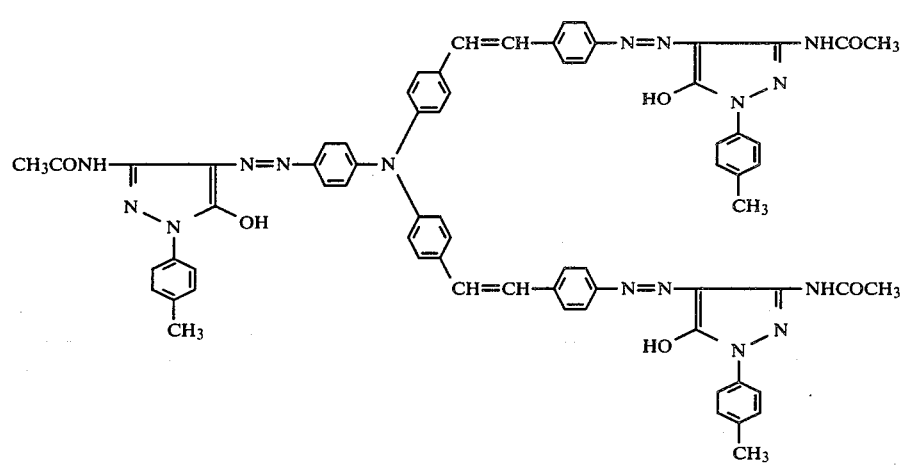
(K-35)
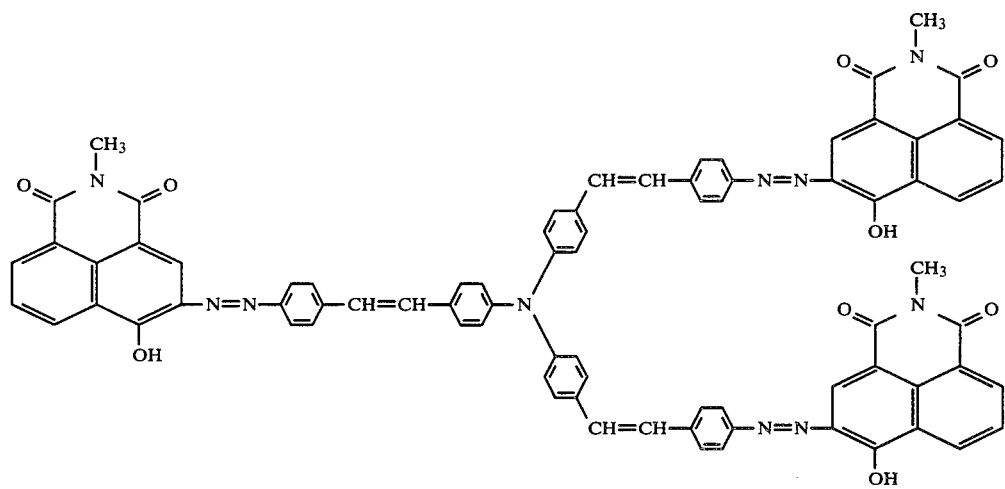
(K-36)
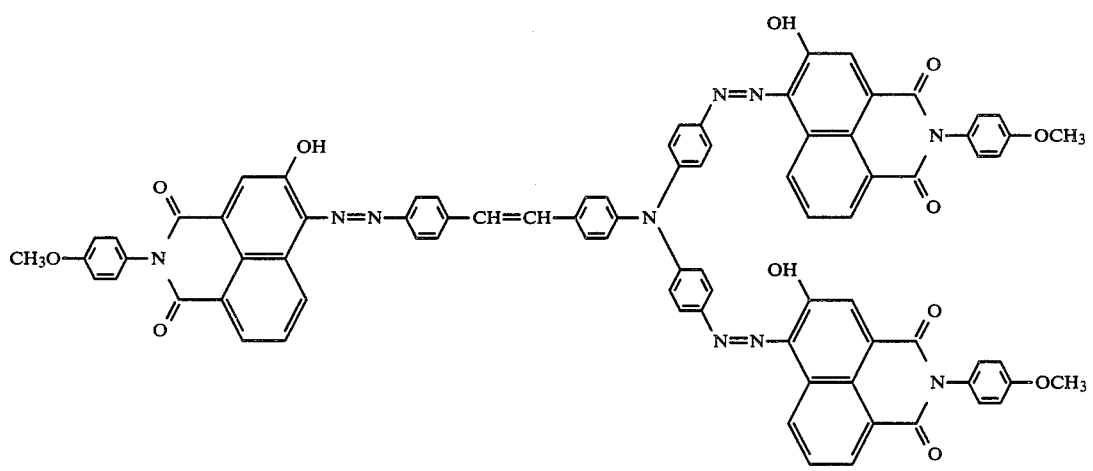
(K-37)

-continued
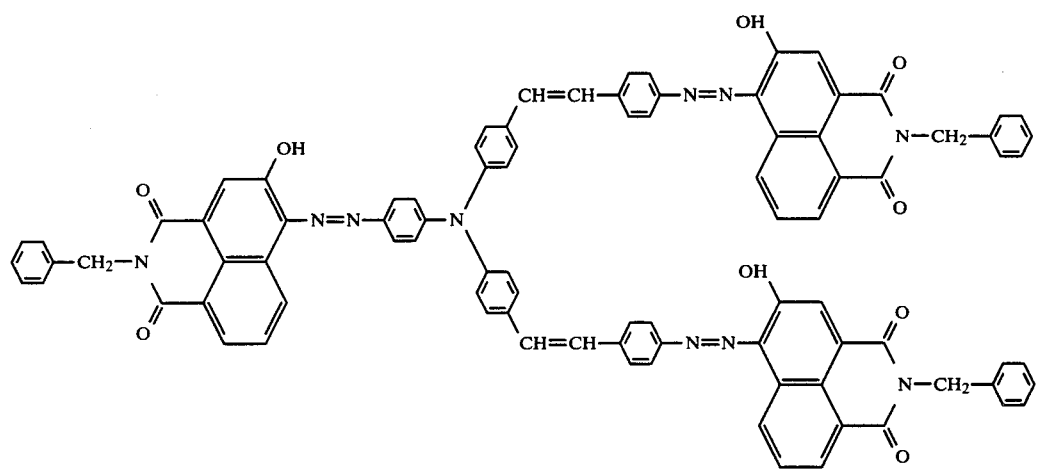
(K-38)
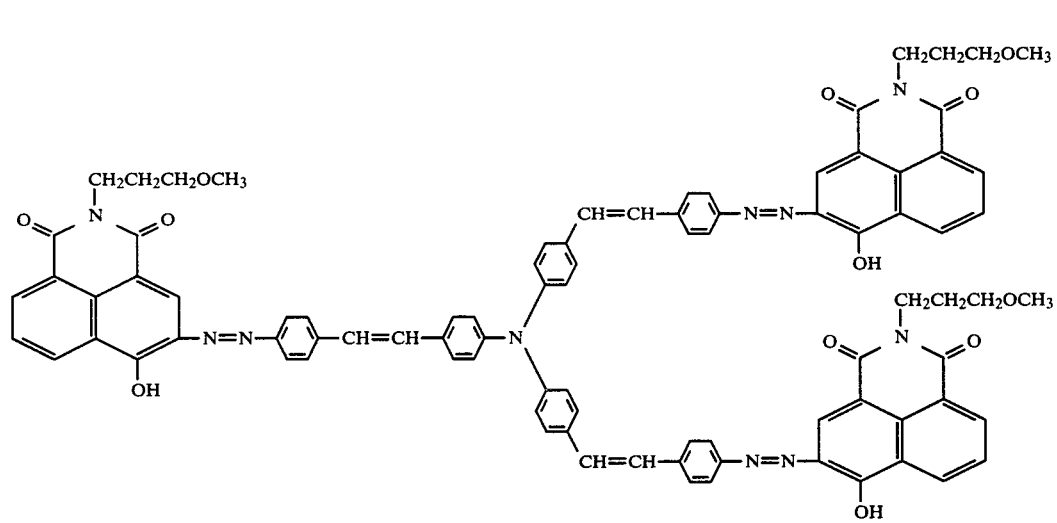
(K-39)
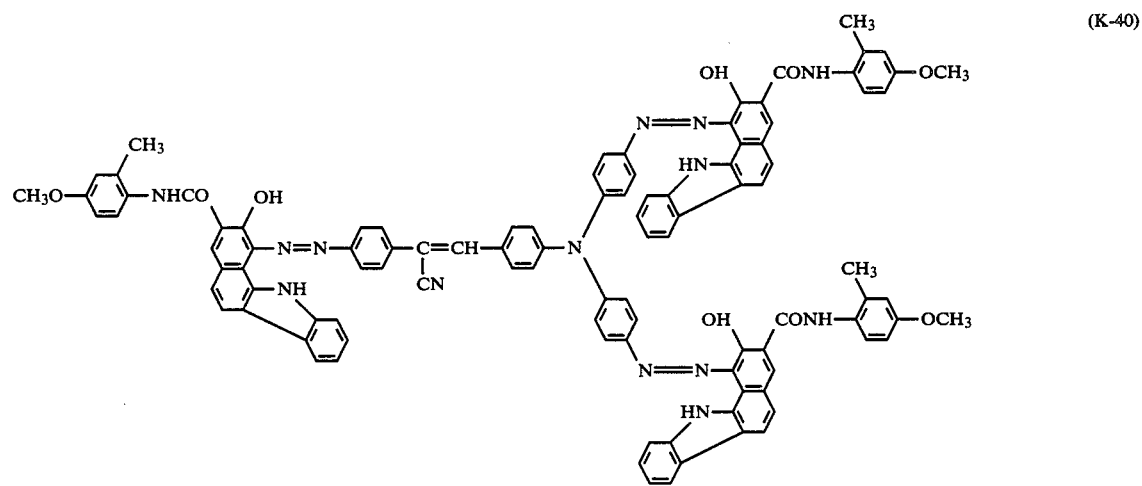
(K-40)

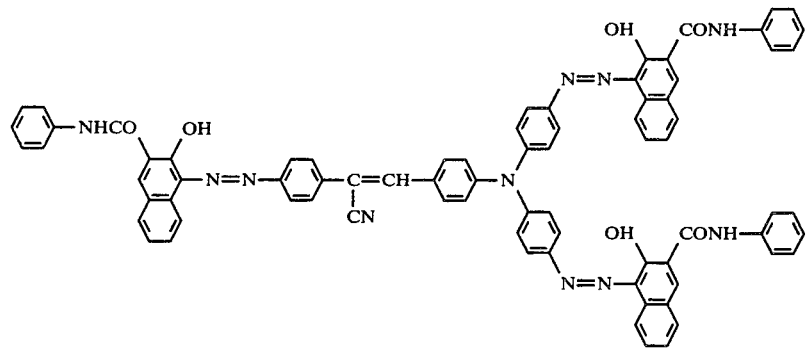
(K-41)
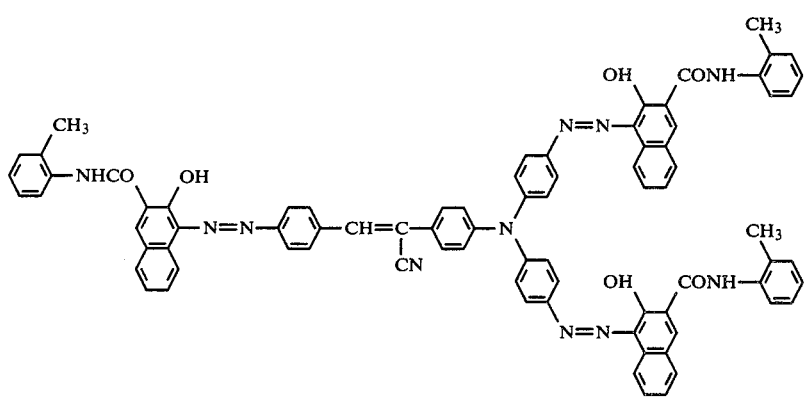
(K-42)
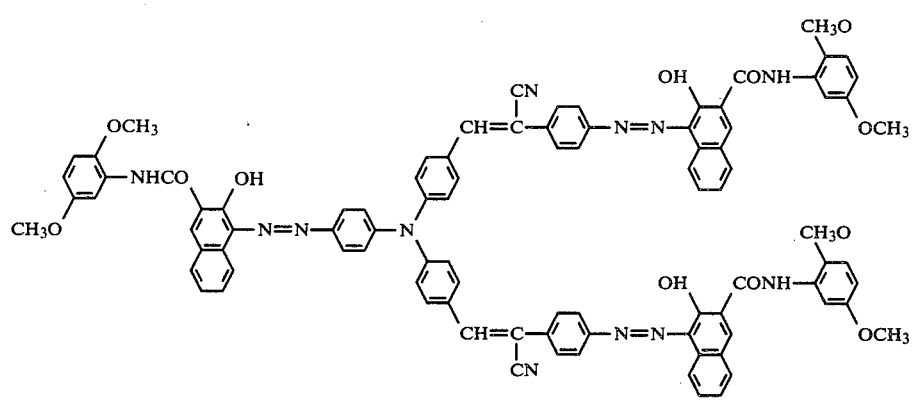
(K-43)
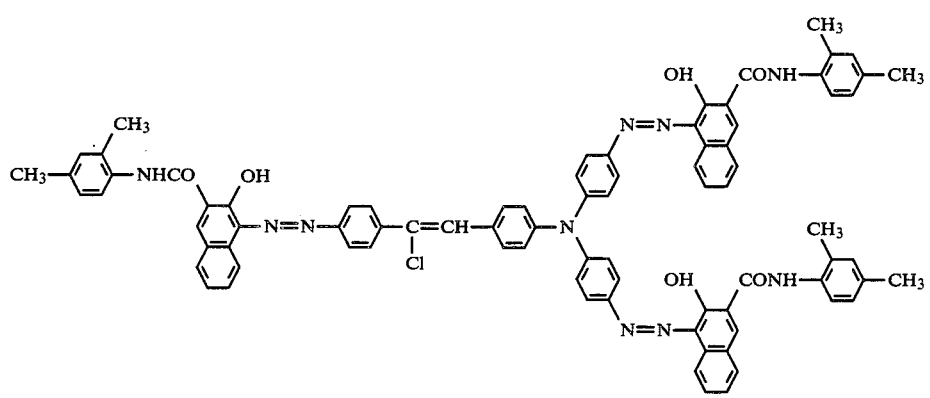
(K-44)

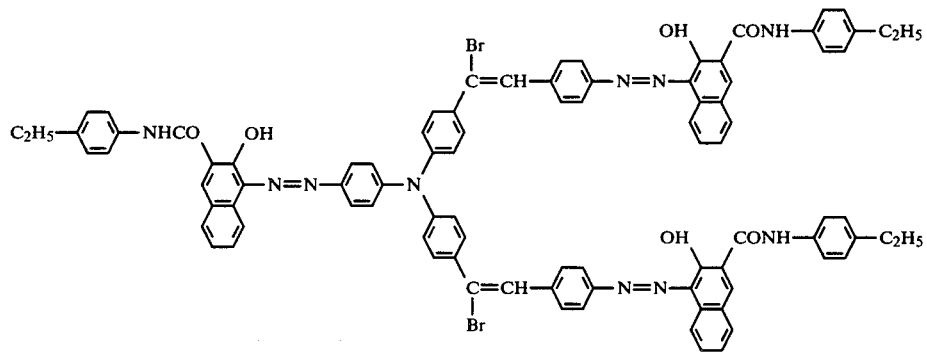
(K-45)
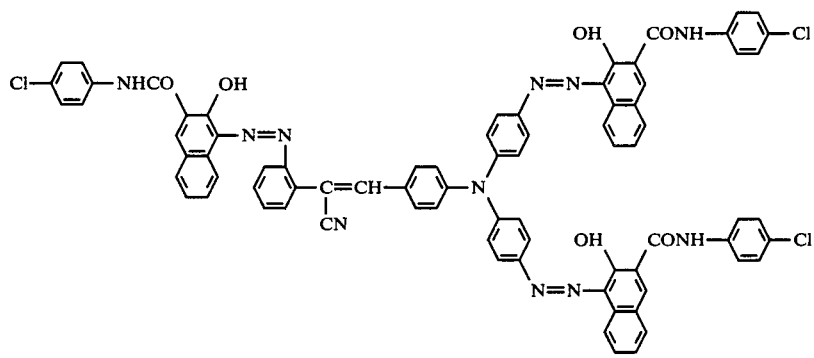
(K-46)
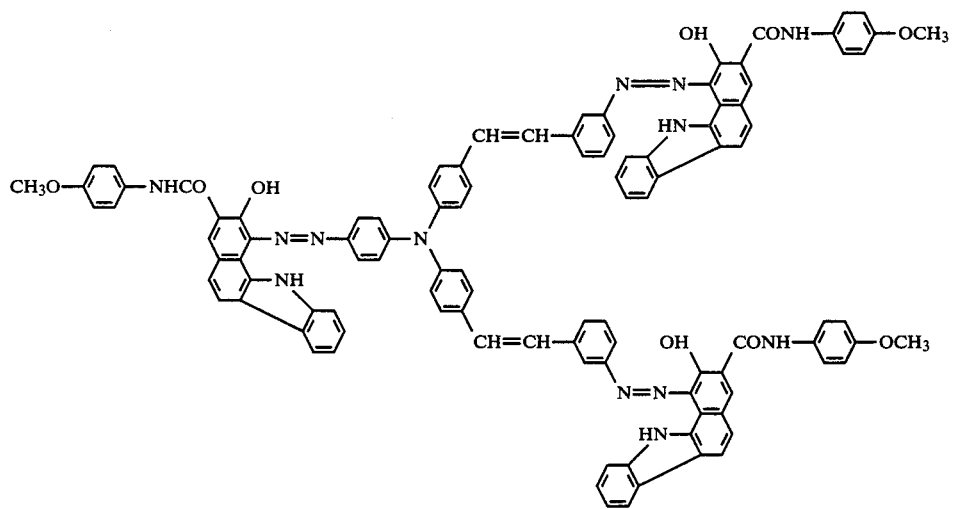
(K-47)

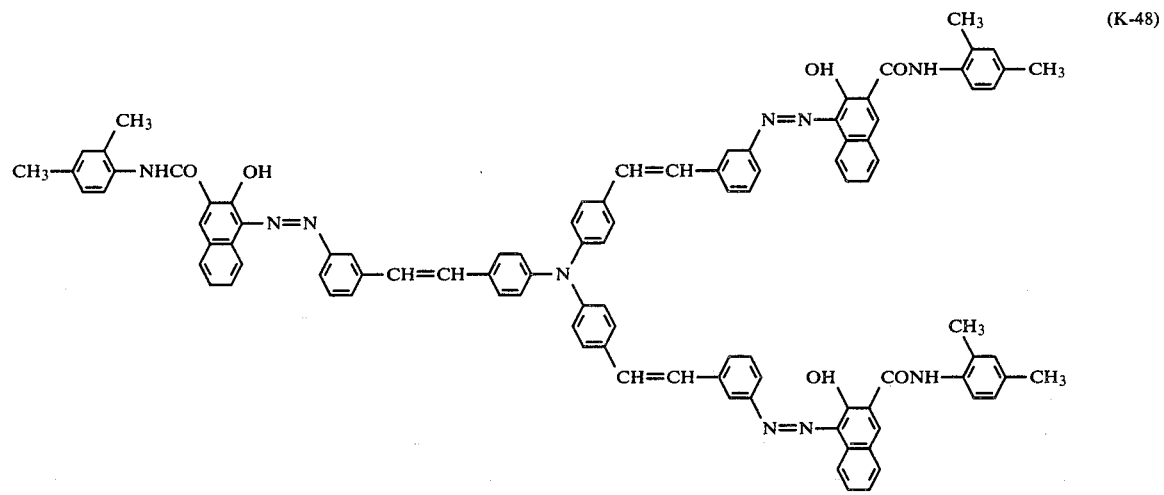
(K-48)
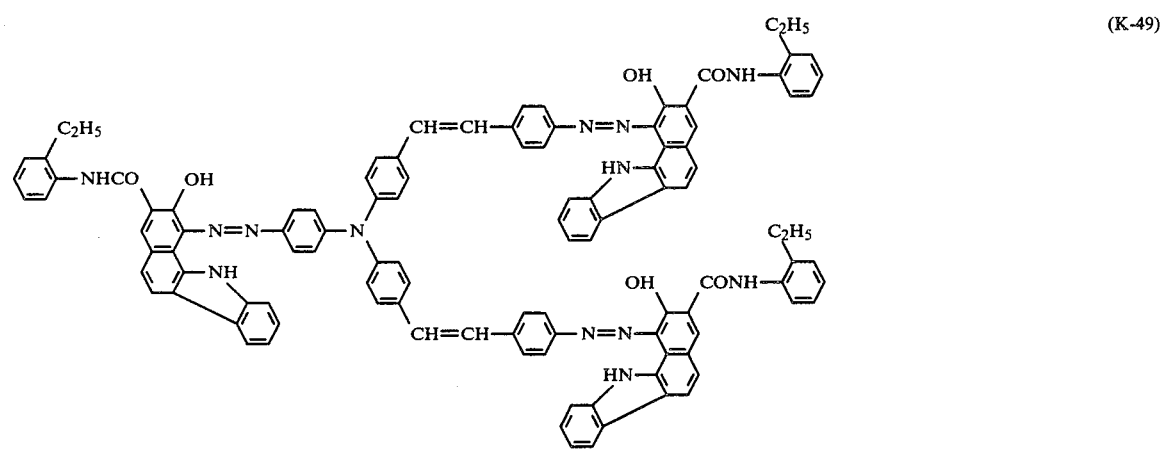
(K-49)
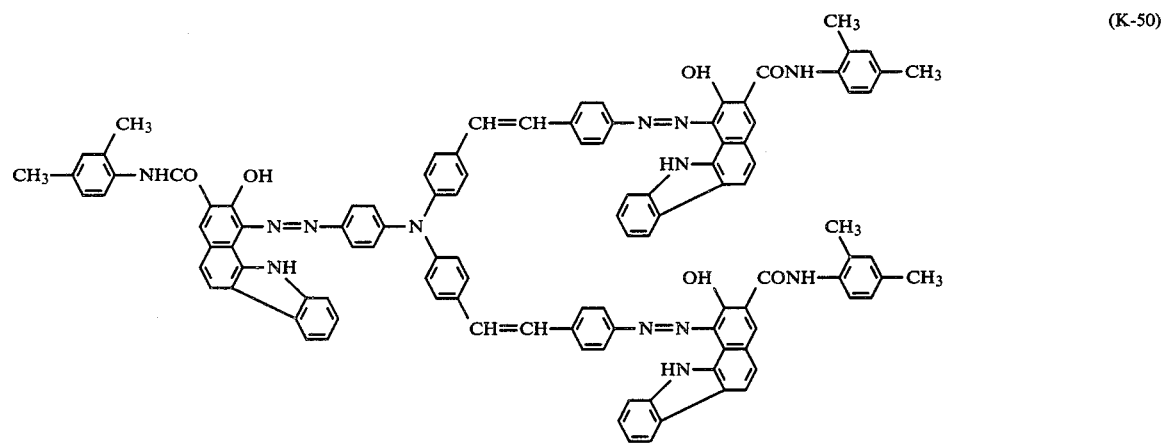
(K-50)

-continued
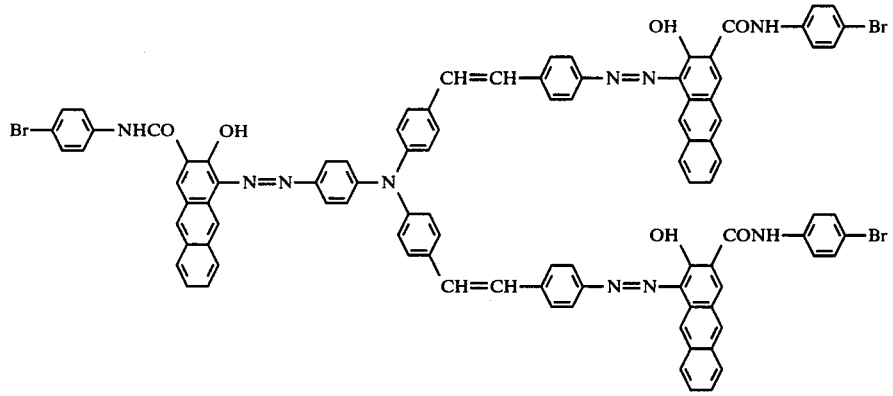 (K-51)
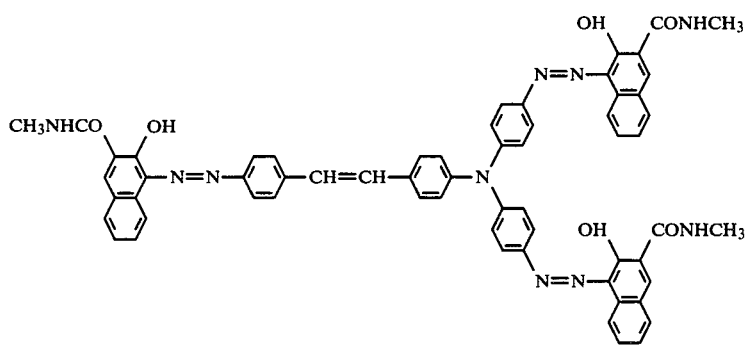 (K-52)
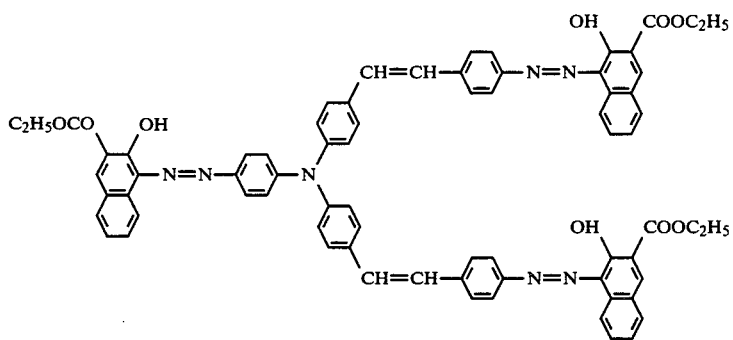 (K-53)
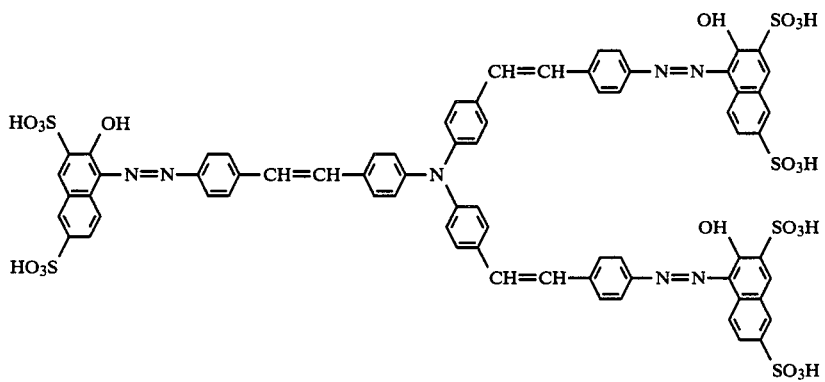 (K-54)

-continued
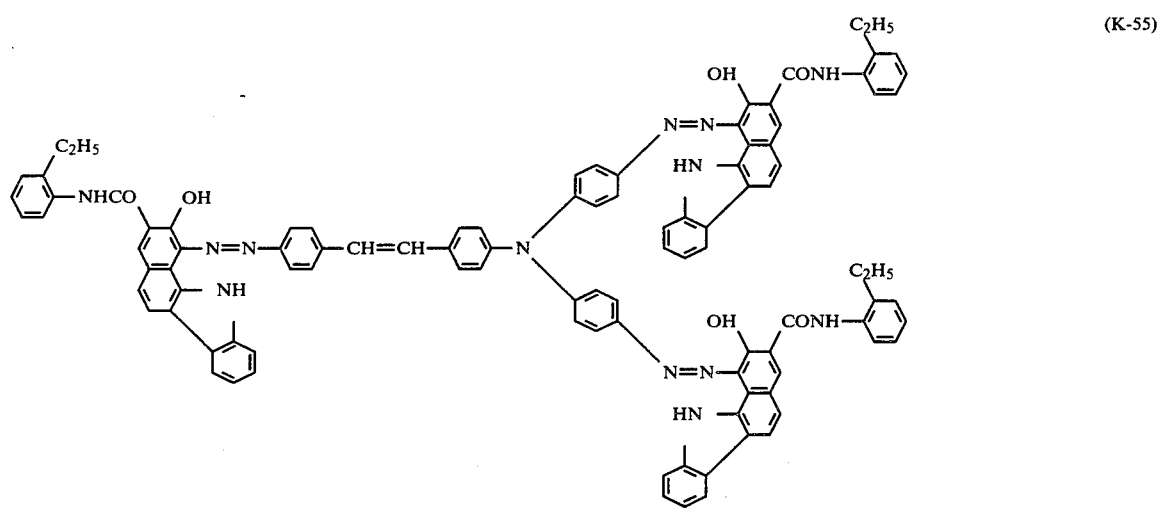
(K-55)
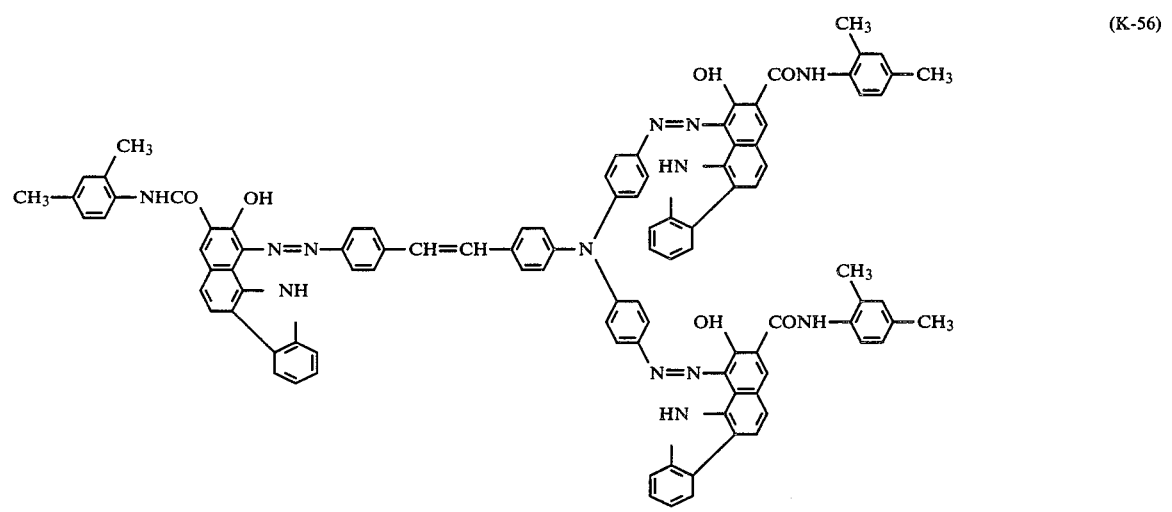
(K-56)
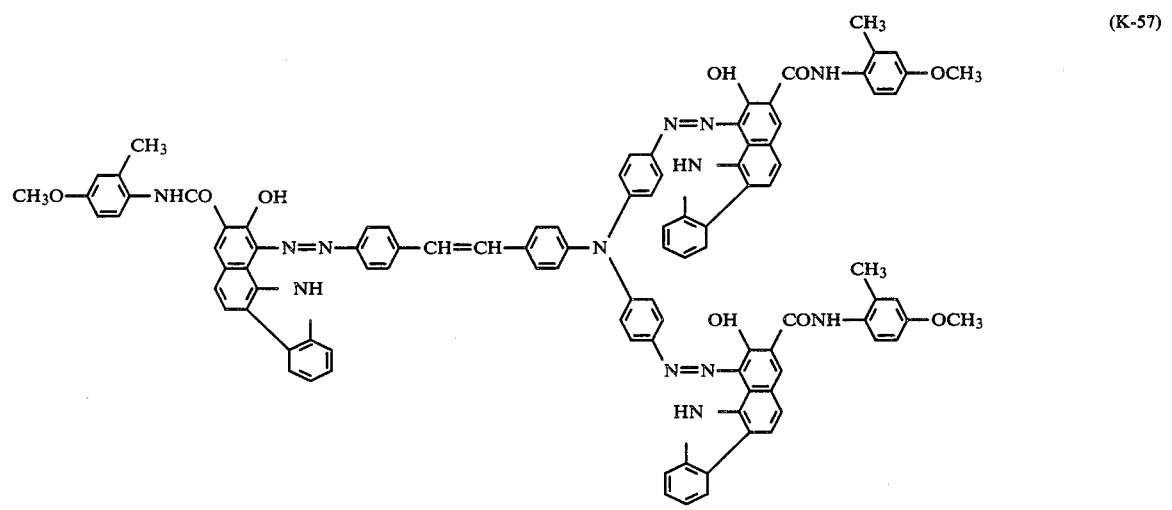
(K-57)

-continued

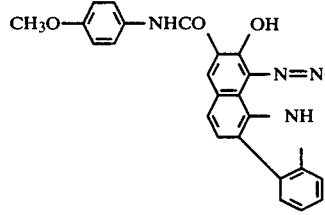 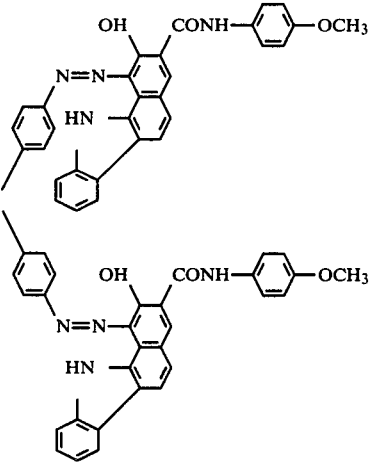

(K-58)

These trisazo compounds can be obtained by any known methods. Some examples are shown below.

SYNTHESIS 1 (PRODUCTION OF COMPOUND K-5)

In N,N-dimethylformamide, 4,4'-dinitro-4"-formyltriphenylamine is reacted with tetraethyl-p-nitrobenzylphosphonate in the presence of a base catalyst such as sodium methylate to thereby obtain 4,4'-dinitro-4"-(4-nitrostyryl)triphenylamine. The reaction product is reduced with iron and hydrochloric acid in N,N-dimethylformamide to obtain 4,4'-diamino-4"-(4-aminostyryl)triphenylamine.

The so obtained 4,4'-diamino-4"-(4-aminostyryl)triphenylamine (3.9 g or 0.01 mol) is dispersed in a mixture of concentrated hydrochloric acid (10 ml) and water (20 ml). To the resulting dispersion, a separately prepared solution of 2.3 g (0.033 mol) of sodium nitrite in 5 ml of water is added dropwise under agitation at a controlled temperature between 0° and 5° C., and the resulting mixture is agitated for another one hour at the same temperature.

After the reaction, the small amount of the residue is filtered off and 42% hydroborofluoric acid (20 ml) is added to the filtrate. The resulting precipitate is recovered by filteration, washed with water and dried thoroughly. The resulting hexazonium salt is dissolved in N,N-dimethylformamide (1,000 ml) under cooling.

To the resulting solution, 8.8 g (0.03 mol) of 2-hydroxy-3-naphthoic acid-2',4'-dimethylanilide (naphthol AS-MX) is added at an internal temperature of 7°-10° C. To the resulting solution, a separately prepared solution of 90 g (0.06 mol) of triethanolamine in 50 ml of N,N-dimethylformamide is added dropwise under agitation at the same temperature.

Following the addition, the mixture is agitated for another one hour at the same temperature, than for another three hours at room temperature. The resulting precipitate is recovered by filtration, washed first with N,N-dimethylformamide, then with acetone, and subsequently dried to obtain 10.7 g of the desired trisazo compound (yield: 82%, m.p. ≧ 300° C.).

This compound is identified as the end compound by IR analysis (amide absorption at $\nu = 1680$ cm$^{-1}$) and by the following elemental analysis.

|  | Calculated | Found |
|---|---|---|
| C (%) | 76.71 | 76.42 |
| H (%) | 5.12 | 5.40 |
| N (%) | 10.78 | 10.71 |

SYNTHESIS 2 (PRODUCTION OF COMPOUND K-41)

According to the method described in "Organic Reaction", 15, 204, p-nitrobenzyl cyanide is reacted with 4,4'-dinitro-4"-formyltriphenylamine in acetonitrile in the presence of piperidine to obtain the condensation product, 4,4'-dinitro-4"-(α-cyano-4-nitrostyryl)triphenylamine. That product is reduced with iron and hydrochloric acid in N,N-dimethylformamide to obtain 4,4'-diamino-4"-(α-cyano-4-aminostyryl)triphenylamine. The so obtained 4,4'-diamino-4"-(α-cyano-4-aminostyryl)triphenylamine (4.2 g of 0.01 mol) is dispersed in a mixture of concentrated hydrochloric acid (10 ml) and water (20 ml).

To the resulting dispersion, a separately prepared solution of 2.3 g (0.033 mol) of sodium nitrite in water (5 ml) is added dropwise under agitation at 0°-5° C., and the mixture is subsequently agitated for another one hour at the same temperature.

After the reaction, the small amount of the residue is filtered off and 42% hydroborofluoric acid (20 ml) is added to the filtrate. The resulting precipitate is obtained by filtration, washed with water and dried thoroughly. The resulting hexazonium salt is dissolved in N,N-dimethylformamide (1,000 ml) under cooling.

To the resulting solution, 7.9 g (0.03 mol) of 2-hydroxy-3-naphthoic acid anilide (naphthol AS) is added at internal temperature of 7°-10° C. To the resulting solution, a separately prepared solution of 4.9 g (0.06 mol) of sodium acetate in water (50 ml) is added dropwise under agitation at the same temperature.

Following the addition, the mixture is agitated for another one hour at the same temperature, then for another three hours at room temperature. The resulting precipitate is recovered by filtration, washed first with N,N-dimethylformamide, then with acetone, and subsequently dried to obtain 9.9 g of the desired trisazo compound (yield: 80%, m.p. ≧ 300° C.).

This compound is identified as the end compound by IR analysis (amide absorption at $\nu = 1680 \text{ cm}^{-1}$) and by the following elemental analysis.

|       | Calculated | Found |
|-------|------------|-------|
| C (%) | 75.53      | 75.31 |
| H (%) | 4.31       | 4.58  |
| N (%) | 12.42      | 12.24 |

The triazo compounds of formula (I) have excellent photoconductivity, and a high-quality photoreceptor can be produced by forming on a conductive support a photosensitive layer having these trisazo compounds dispersed in a binder. Alternatively, a "function separated" photoreceptor can be produced by using one of these trisazo compounds as a carrier generation material in combination with an effective carrier transport material.

Figure 2:
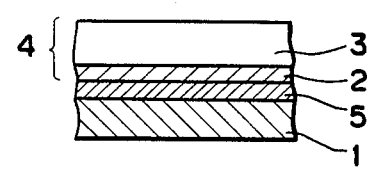
Figure 3:
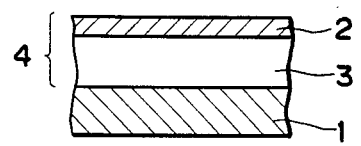
Figure 4:
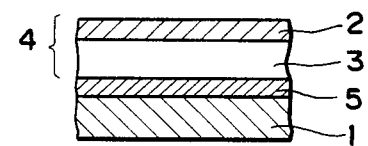
Figure 5:
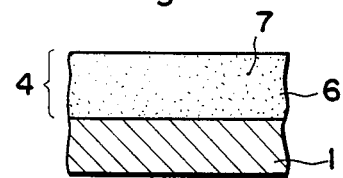
Figure 6:
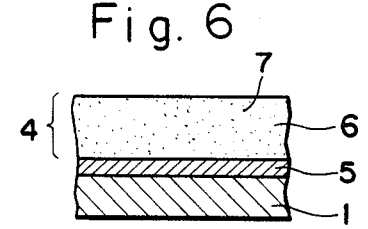

Various layer arrangements are known for the "function separated" photoreceptor and any of them can be used in the present invention. Typical and usual embodiments are shown in FIGS. 1 to 6. In the embodiments of FIGS. 1 and 3, a conductive support 1 is overlaid with a carrier generation layer 2 containing the trisazo compound of formula (I) as the main component and a carrier transport layer 3 containing a carrier transport material as the main component. The layers 2 and 3 are laminated to form a photosensitive layer 4. As shown in FIGS. 2 and 4, the photosensitive layer 4 may be formed on the conductive layer 1 via an intermediate layer 5. The double-layer arrangement of photosensitive layer 4 is most effective for producing a photoreceptor having the most preferable electrophotographic characteristics. Other possible embodiments of the present invention are illustrated in FIGS. 5 and 6, wherein a photosensitive layer 4 having the carrier generation material 7 dispersed is a layer 6 which contains a carrier transport material as the main component is formed on the conductive layer 1 either directly (FIG. 5) or through an intermediate layer 5 (FIG. 6).

Examples of the carrier transport material that may be combined with the trisazo compounds of formula (I) used as the carrier generation material include electron acceptor that will transport electrons such as trinitrofluorenone and tetranitrofluorenone. Other examples are polymers having a heterocyclic compound at a side chain as represented by poly-N-vinylcarbazole, as well as electron donors that will transport positive holes such as triazole derivatives, oxadiazole derivatives, imidazole derivatives, pyrazoline derivatives, polyarylalkane derivatives, phenylenediamine derivatives, hydrazone derivatives, amino-substituted calcon derivatives, triarylamine derivatives, carbazole derivatives and stilbene derivatives. It should be understood that many other known carrier transport materials may be used in the present invention.

The carrier generation layer 2 making one layer element of the photosensitive layer 4 of dual structure may be formed on the conductive support 1 or carrier transport layer 3 either directly or optionally through an intermediate layer (e.g. adhesive layer or barrier layer) by one of the following two methods.

M-1: A trisazo compound of formula (I) is dissolved in a suitable solvent, and the resulting solution which optionally contains a binder is applied to the necessary layer.

M-2: A trisazo compound of formula (I) is dispersed in fine particles in a suitable medium by means of a ball mill or homomixer, and the resulting dispersion which optionally contains a binder is applied to the necessary layer.

Solvents or dispersants that may be used in the formation of the carrier generation layer include n-butylamine, diethylamine, ethylenediamine, isopropanolamine, triethanolamine, triethylenediamine, N,N-dimethylformamide, acetone, methyl ethyl ketone, cyclohexanone, benzene, toluene, xylene, chloroform, dichloroethane, dichloromethane, tetrahydrofuran, dioxane, methanol, ethanol, isopropanol, ethyl acetate, butyl acetate and dimethylsulfoxide.

Any binders may be used in the carrier generation or transport layer, and film-forming high-molecular weight polymers which are hydrophobic, have high dielectric constant and are electrical insulators are preferred. Examples of these polymers are listed below.

P-1: polycarbonates
P-2: polyesters
P-3: methacrylic resins
P-4: acrylic resins
P-5: polyvinyl chloride
P-6: polyvinylidene chloride
P-7: polystyrene
P-8: polyvinyl acetate
P-9: styrene-butadiene copolymers
P-10: vinylidene chloride-acrylonitrile copolymers
P-11: vinyl chloride-vinyl acetate copolymers
P-12: vinyl chloride-vinyl acetate-maleic anhydride copolymers
P-13: silicone resins
P-14: silicione-alkyd resins
P-15: phenol-formaldehyde resins
P-16: styrene-alkyd resins
P-17: poly-N-vinylcarbazozole These binders may be used either alone or in admixture.

The carrier generation layer 2 so prepared has a preferred thickness of 0.01 to 20 μm, with the range of 0.05 to 5 μm being particularly preferred. If the carrier generation layer or the photosensitive layer is a dispersion system, the particle size of the trisazo compound of formula (I) is preferably not more than 5 μm, with the size of 1 μm or less being more preferred.

Examples of the conductive support that can be used with the photoreceptor of the present invention include a metal sheet, and paper or plastic films rendered conductive by spreading, vapor deposition or lamination of a conductive polymer, a conductive compound such as indium oxide, or a metal foil such as aluminum, nickel, palladium or gold.

The intermediate layer such as an adhesive layer or barrier layer may be made of a material selected from among the high-molecular weight polymers that are listed above for use as the binder, as well as organic polymers such as gelatin, casein, starch, polyvinyl alcohol, ethyl cellulose and carboxymethyl cellulose, and aluminum oxide.

As will be apparent from the foregoing description, the trisazo compound of formula (I) may be used as a photoconductive material in the photosensitive layer of a photoreceptor, or alternatively, it may be used as a carrier generation material in the double-layered photoconductive layer of a "function separated" photoreceptor. In whichever way, the resulting photoreceptor will prove highly stable against heat and light, exhibit excellent electrophotographic properties with respect to charging characteristics, sensitivity and residual potential, withstand repeated operation with minimum fatigue and hence will have long cycle life.

As a further advantage, the photoreceptor of the present invention has high sensitivity to an illumination having a long wavelength range (≧ca. 780 nm) and hence can be used not only with conventional copying machines but also with other electrophotographic devices such as laser printers and laser facsimiles that can be operated with light sources having a long wavelength range such as semiconductor lasers.

The present invention is hereunder illustrated in greater detail by reference to the following examples.

EXAMPLE 1

A conductive support made by laminating a polyester film with an aluminum foil overlaid with an intermediate layer (0.05 μm thick) made from ES-lec MF-10 (the trade name for a vinyl chloride-vinyl acetate-maleic anhydride copolymer manufactured by Sekisui Chemical Co., Ltd.). To the intermediate layer, a dispersion of 2 parts by weight of Compound K-1 in 140 parts by weight of 1,2-dichloroethane was applied to give a dry thickness of 0.5 μm.

To the so formed carrier generation layer, a solution of a mixture of 6 parts by weight of 1-(4-(N,N-diethylamino)benzylidene)amino-1,2,3,4-tetrahydroquinoline (for its chemical structure, see below) and 10 parts by weight of Vylon 200 (the trade name for a polyester manufactured by Toyobo Co., Ltd.) in 90 parts by weight of 1,2-dichloroethane was applied to form or carrier transport layer having a dry thickness of 10 μm.

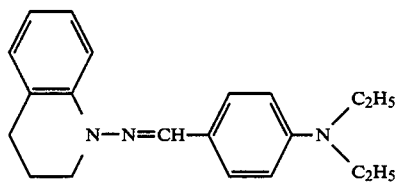

By this procedure, a photoreceptor using a photoconductive layer of dual structure was prepared. Its electrophotographic characteristics were measured dynamically with paper analyzer Model PS-428 which was a product of Kawaguchi Electric Works Co., Ltd. First, the surface of the photosensitive layer was charged at a negative voltage of 6.0 kV for a period of 5 seconds, and the resulting surface potential $V_A$ was measured. Then, the photoreceptor was illuminated with a tungsten lamp to give a surface illuminance of 35 lux until the surface potential was reduced by half. The exposure required to cause this reduction (half exposure or E ½ in lux. sec) was measured. The photoreceptor was also given an exposure of 30 lux. sec, and the resulting surface potential residual potential $V_R$) was measured. The results are shown in Table 1. The same experiment was conducted 100 times, and the results after this repeated operation are also shown in Table 1.

TABLE 1

|  | Initial | After 100 cycles |
|---|---|---|
| $V_A$ (V) | −620 | −650 |
| E ½ (lux · sec) | 1.8 | 1.9 |
| $V_R$ (V) | 0 | 0 |

COMPARATIVE EXAMPLE 1

A comparative photoreceptor was prepared as in Example 1 except that the following trisazo compound was used as the carrier generation material:

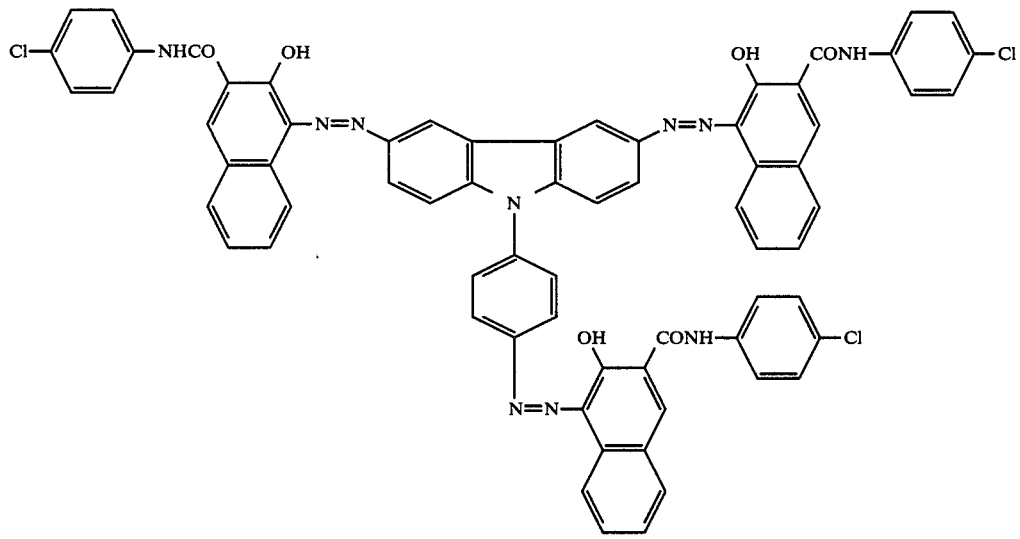

The same experiment was conducted with this comparative sample as in Example 1, and the results are shown in Table 2.

TABLE 2

|  | Initial | After 100 cycles |
|---|---|---|
| $V_A$ (V) | −780 | −820 |
| E ½ (lux · sec) | 8.5 | 9.4 |
| $V_R$ (V) | −30 | −110 |

As Tables 1 and 2 show, the photoreceptor according to the present invention was far superior to the comparative sample in respect to sensitivity, residual potential and stability against cyclic operation.

EXAMPLE 2

A photoreceptor according to the present invention was fabricated as in Example 1 except that Compound K-2 was used as the carrier generation material. The same experiment was conducted with this photoreceptor as in Example 1, and the results are shown in Table 3.

TABLE 3

|  | Initial | After 100 cycles |
|---|---|---|
| $V_A$ (V) | −920 | −950 |
| E ½ (lux · sec) | 1.8 | 1.8 |
| $V_R$ (V) | 0 | 0 |

EXAMPLE 3

A polyester film having a vapor-deposited aluminum layer was overlaid with an intermediate layer of the same composition as used in Example 1. To the intermediate layer, a dispersion of 2 parts by weight of Compound K-3 in 140 parts by weight of 1,2-dichloroethane was applied to give a dry thickness of 0.5 μm.

The the so prepared carrier generation layer, a solution of a mixture of 6 parts by weight of p-(N,N-diethylamino)benzaldehyde-1,1-diphenylhydrazone and 10 parts by weight of Panlite L-1250 (the trade name for a polycarbonate produced by Teijin Chemicals Ltd.) in 90 parts by weight of 1,2-dichloroethane was applied to form a carrier transport layer having a dry thickness of 12 μm. By this procedure, a photoreceptor according to the present invention having a photoconductive layer of dual structure was prepared. This sample was subjected to the same experiment as in Example 1. The results were as follows: $V_A = -860$ V, E ½ = 1.9 lux. sec, and $V_R = 0$ V.

COMPARATIVE EXAMPLE 2

A comparative photoreceptor was made as in Example 3 except that the following trisazo compound was used as the carrier generation material:

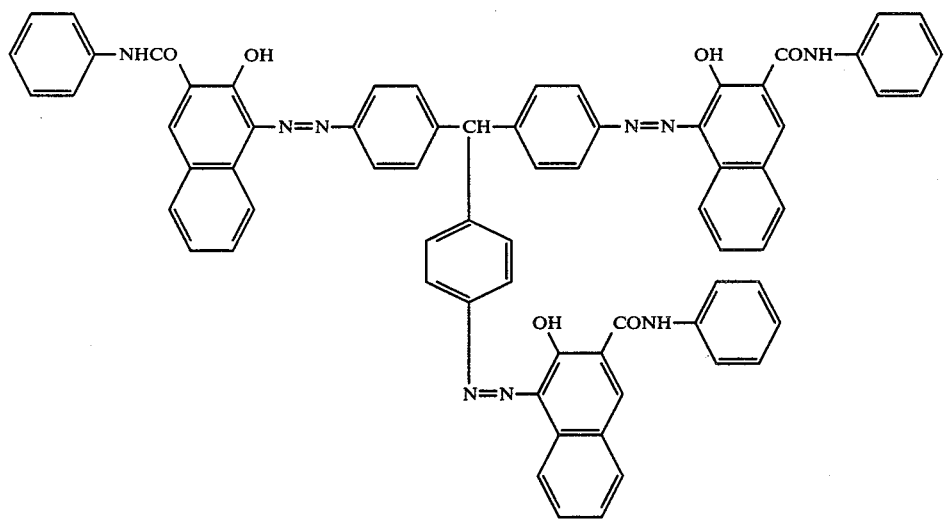

This comparative sample was subjected to the same measurement as in Example 1 and the following results were obtained: $V_A = -930$ V, E ½ = 7.5 lux.sec, $V_R = -40$ V.

As the above results show, the photoreceptor samples according to the present invention were far superior to the comparative sample in respect to the initial electrophotographic characteristics.

EXAMPLE 4

The photoreceptor prepared in Example 3 and the sample prepared in Comparative Sample 2 were set in an electrophotocopier U-Bix 2000R (product of Konishiroku Photo Industry Co., Ltd.) and subjected to a durability test consisting of 10,000 cycles of charging, exposure and cleaning steps. Immediately after the test, the two samples were subjected to the same measurement as in Example 1. The results are shown in Table 4.

TABLE 4

| | Durability after 10,000 cycles of operation | |
|---|---|---|
| | Sample of Example 3 | Sample of Comparative Example 2 |
| $V_A$ (V) | −890 | −1120 |
| E ½ (lux · sec) | 1.9 | 11.5 |
| $V_R$ (V) | 0 | −80 |

As this table shows, the electrophotographic characteristics of the sample of Comparative Example 2 were appreciably deteriorated after 10,000 cycles of charging and exposure steps, but on the other hand, the sample of the present invention (Example 3) retained its initial characteristics after such repeated operation.

EXAMPLE 5

A conductive support of the same composition as used in Example 1 was overlaid with a carrier generation layer that was prepared by applying a dispersion of a mixture of 2 parts by weight of Compound K-6 and an equal amount of Panlite L-1250 in 140 parts by weight of 1,2-dichloroethane to give a dry thickness of 1 μm.

To the so prepared carrier generation layer, a solution of a mixture of 6 parts by weight of 3-(p-methoxystyryl)-9-(p-methoxyphenyl)carbazole and 10 parts by weight of Acrypet (the trade name for a methacrylic resin manufactured by Mitsubishi Rayon Company Limited) in 90 parts by weight of 1,2-dichloroethane to form a carrier transport layer having a dry thickness of 10 μm. By this procedure, a photoreceptor according to the present invention having a photoconductive layer of the double-layer arrangement was fabricated.

This sample was subjected to the same experiment as in Example 1, and the following results were obtained: E ½ = 2.0 lux.sec and $V_R = 0$ V.

EXAMPLE 6

A conductive support with an intermediate layer of the same type as used in Example 1 was overlaid with a carrier generation layer that was formed by applying a solution of Compound K-25 in 2% ethylenediamine to give a dry thickness of 0.3 μm.

To the so formed carrier generation layer, a solution of a mixture of 6 parts by weight of 4,4'-dimethyl-4''-(4-methoxy)styryl-triphenylamine and 10 parts by weight of Jupilon S-100 (the trade name for a polycarbonate produced by Mitsubishi Gas Chemical Co., Inc.) in 90 parts by weight of 1,2-dichloroethane was applied to form a carrier transport layer having a dry thickness of 14 μm. By this method, a photoreceptor according to the present invention having a photoconductive layer of the dual structure was prepared.

This sample was subjected to the same experiment as in Example 1 and the following results were obtained: E = ½ = 1.9 lux.sec, and $V_R = 0$ V. The same sample was set on U-Bix 2000 R and a copying test was conducted with this machine. Sharp copies that were faithful to the original, had high contrast and good gradation were obtained. The same results were obtained even after the test was repeated 10,000 times.

EXAMPLE 7

A polyester film having a vapor-deposited aluminum layer was overlaid with an intermediate layer (0.05 μm thick) that was made from ES-lec MF-10. Three parts by weight of Compound K-9, 6 parts by weight of 4,4'-dimethyltriphenylamine and 10 parts by weight of Panlite L-1250 were added to 100 parts by weight of 1,2-dichloroethane, and the mixture was thoroughly agitated in a ball mill to provide a homogeneous dispersion. This dispersion was applied to the intermediate layer to give a dry thickness of 10 μm, thereby producing a photoreceptor according to the present invention.

The electrophotographic characteristics of this sample were measured dynamically with Model SP-428 paper analyzer. The surface of the photosensitive layer was charged at a positive voltage of 6 kV for 5 seconds, and then the photoreceptor was illuminated with a tungsten lamp to give a surface illuminance of 35 lux until the initial surface potential was reduced by half. The half exposure (E ½) was 1.8 lux.sec. The photoreceptor was further given an exposure of 30 lux sec. and the resulting surface potential (residual potential) was $V_R = 0$ V.

EXAMPLE 8

The outer surface of aluminum drum (100 mm$^\phi$) was provided with an intermediate layer (0.05 μm thick) made from ES-lec MF-10. To the intermediate layer, a dispersion that was prepared by agitating a mixture of Compound K-11 (4 g) and 1,2-dichloroethane (400 ml) in a ball mill for 24 hours was applied to give a dry thickness of 0.6 μm.

To the resulting carrier generation layer, a solution of 30 g of N,N-diethylaminobenzaldehyde-1,1-diphenylhydrazone of the following formula:

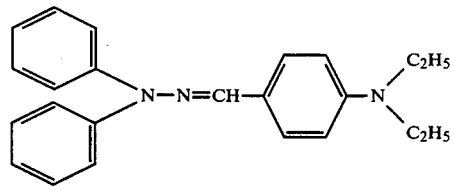

and 50 g of Jupilon S-1000 in 400 ml of 1,2-dichloroethane was applied to form a carrier transport layer having a dry thickness of 13 μm.

The so prepared drum-shaped photoreceptor was set in a modified version of U-Bix V 2 (an electrophotocopier produced by Konishiroku Photo Industry Co., Ltd.) and subjected to a copying test. Sharp copies that were faithful to the original and had high contrast were obtained. The same results were obtained even after the test was repeated 10,000 times.

COMPARATIVE EXAMPLE 3

A comparative sample of drum-shaped photoreceptor was prepared as in Example 8 except that Compound K-11 was replaced by a bisazo compound of the formula shown below. This sample was subjected to a copying test as in Example 8, and the copy obtained had a foggy image. As more copies were made, the contrast of the image decreased, and the copy obtained after 10,000 cycles of operation had no visible image at all.

Formula of bisazo compound

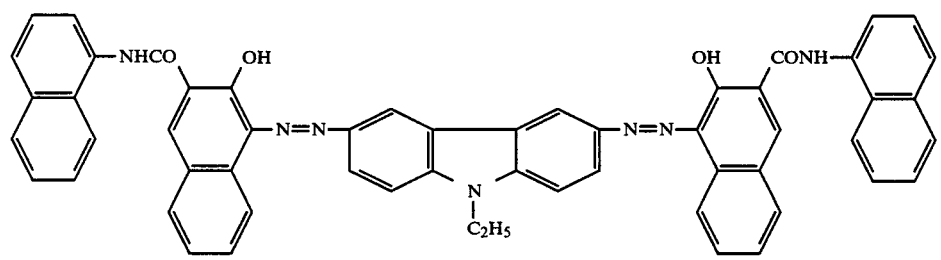

EXAMPLE 9

A conductive support comprising a polyester film laminated with an aluminum foil was overlaid with an intermediate layer (0.05 μm thick) made from ES-lec MF-10. A mixture of 5 g Compound K-16 and 3.3 g of Panlite L-1250 were added to 100 ml of dichloromethane, and the resulting mixture was agitated in a ball mill for 24 hours to form a homogeneous dispersion. This dispersion was applied to the previously formed intermediate layer to give a dry thickness of 10 μm. The so prepared photoreceptor was checked for its half exposure and residual potential as in Example 1 except that the surface of the photosensitive layer was charged to a positive voltage of 6 kV. The results were as follows: E ½=4.9 lux.sec, and $V_R = +15$ V.

EXAMPLE 10

The outer surface of an aluminum drum (100 mmφ) was provided with an intermediate layer (0.05 μm thick) made from ES-lec MF-10. To the intermediate layer, a dispersion that was prepared by agitating a mixture of Compound K-22 (4 g) and 1,2-dichloroethane (400 ml) in a ball mill for 24 hours was applied to give a dry thickness of 0.5 μm.

To the so formed carrier generation layer, a solution of 30 g of 4-methyl-4'-styryltriphenylamine and 50 g of Panlite L-1250 in 400 ml of 1,2-dichloroethane was applied to form a carrier transport layer having a dry thickness of 12 μm.

The so fabricated photoreceptor in a drum shape having a photoconductor of the dual structure had a spectral sensitivity of 1.20 μJ/cm² (half exposure) at 790 nm.

The photoreceptor was then set in a laboratory scale copying machine equipped with a semiconductor laser that was designed to operate at 790 nm and provide a laser light intensity of 0.85 mW at the photoreceptor surface. After its surface was charged to a negative voltage of 6 kV, the photoreceptor was illuminated with the laser light and subjected to reversal development at a bias voltage of −250 V. A copy with an image of high contrast and having no fog was obtained. The same result was obtained when the copying operation was repeated 10,000 times.

EXAMPLES 11 TO 14

Samples of drum-shaped photoreceptor were prepared as in Example 10 except that Compound K-22 was replaced by Compounds K-18, K-20, K-40, K-49, K-50 and K-57. The respective samples had the following spectral sensitivities at 790 nm.

TABLE 5

| Trisazo compound (carrier generation material) | K-18 | K-20 | K-40 | K-49 | K-50 | K-57 |
|---|---|---|---|---|---|---|
| Half exposure (μJ/cm²) | 1.30 | 1.45 | 1.25 | 1.20 | 1.35 | 1.20 |

These samples were subjected to a copying test with the laboratory scale copying machine used in Example 10. Each sample gave a fogless sharp image, and the same result was obtained when the copying operation was repeated 10,000 times.

As is clear from the foregoing data, the photoreceptors according to the present invention have excellent electrophotographic characteristics such as high sensitivity and low residual voltage, as well as great stability against cyclic operation. Furthermore, these photoreceptors have sufficiently high sensitivity to light in the long wavelength range and can be subjected to cyclic copying operation without fatigue.

What is claimed is:

1. A photoreceptor comprising a photosensitive layer and an electrically conductive support, wherein the photosensitive layer comprises a compound represented by the following formula (I):

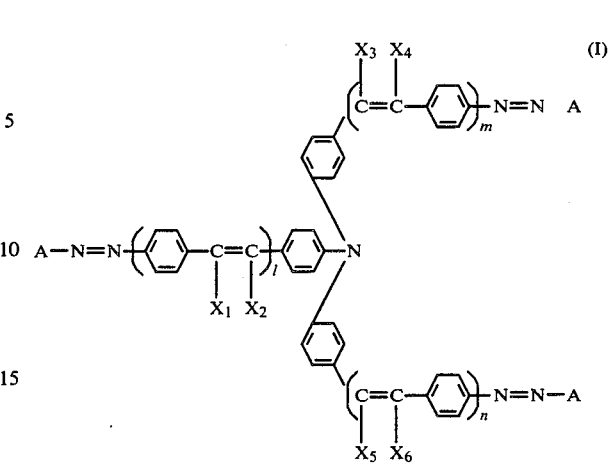

wherein $X_1$, $X_2$, $X_3$, $X_4$, $X_5$ and $X_6$ are each a hydrogen atom, a halogen atom or a cyano group; l, m and n are each 0 or 1, provided that at least one of l, m and n is 1; and A is

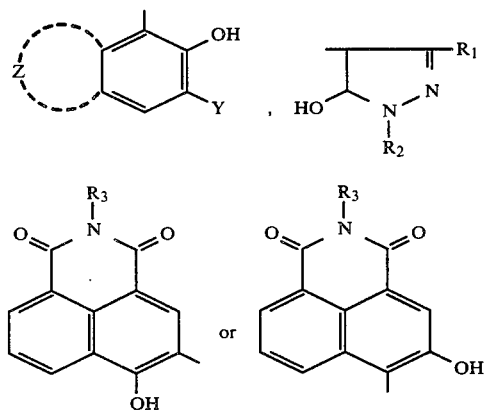

wherein Y is a hydrogen atom, a hydroxy group, a carboxyl group or its ester group, a sulfo group, a carbamoyl group, or a sulfamoyl group; Z is an atomic group necessary for constituting an aromatic carbon ring or an aromatic heteroring; $R_1$ is a hydrogen atom, an alkyl group, an amino group, a carboxyl group or its ester group, a carbamoyl group, or a cyano group; $R_2$ is an aryl group; and $R_3$ is an alkyl group, an aralkyl group or an aryl group.

2. A photoreceptor according to claim 1, wherein l in said formula (I) is 1, and m in the same formula is 0 (zero).

3. A photoreceptor according to claim 2, wherein n in said formula (I) is 0 (zero).

4. A photoreceptor according to claim 3, wherein $X_1$ and $X_2$ in said formula (I) are both hydrogen atoms.

5. A photoreceptor according to claim 1, wherein A in said formula (I) is

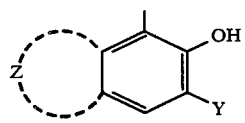

wherein Y and Z are as defined above.

6. A photoreceptor according to claim 5, wherein said Y is

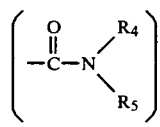

(wherein $R_4$ is a hydrogen atom, a lower alkyl group, or a phenyl group; and $R_5$ is a hydrogen atom, a lower alkyl group, an aromatic group, or an aromatic heterocyclic group).

7. A photoreceptor according to claim 6, wherein said $R_4$ is a hydrogen atom, and said $R_5$ is an aromatic group.

8. A photoreceptor according to claim 7, wherein said $R_5$ is a phenyl or naphthyl group.

9. A photoreceptor according to claim 8, wherein said $R_5$ is a phenyl group substituted by a lower alkyl group, a lower alkoxy group, or a halogen atom.

10. A photoreceptor according to claim 8, wherein said $R_5$ is an unsubstituted phenyl or naphthyl group.

11. A photoreceptor according to claim 1, wherein said compound represented by formula (I) is selected from the group consisting of the following compounds:

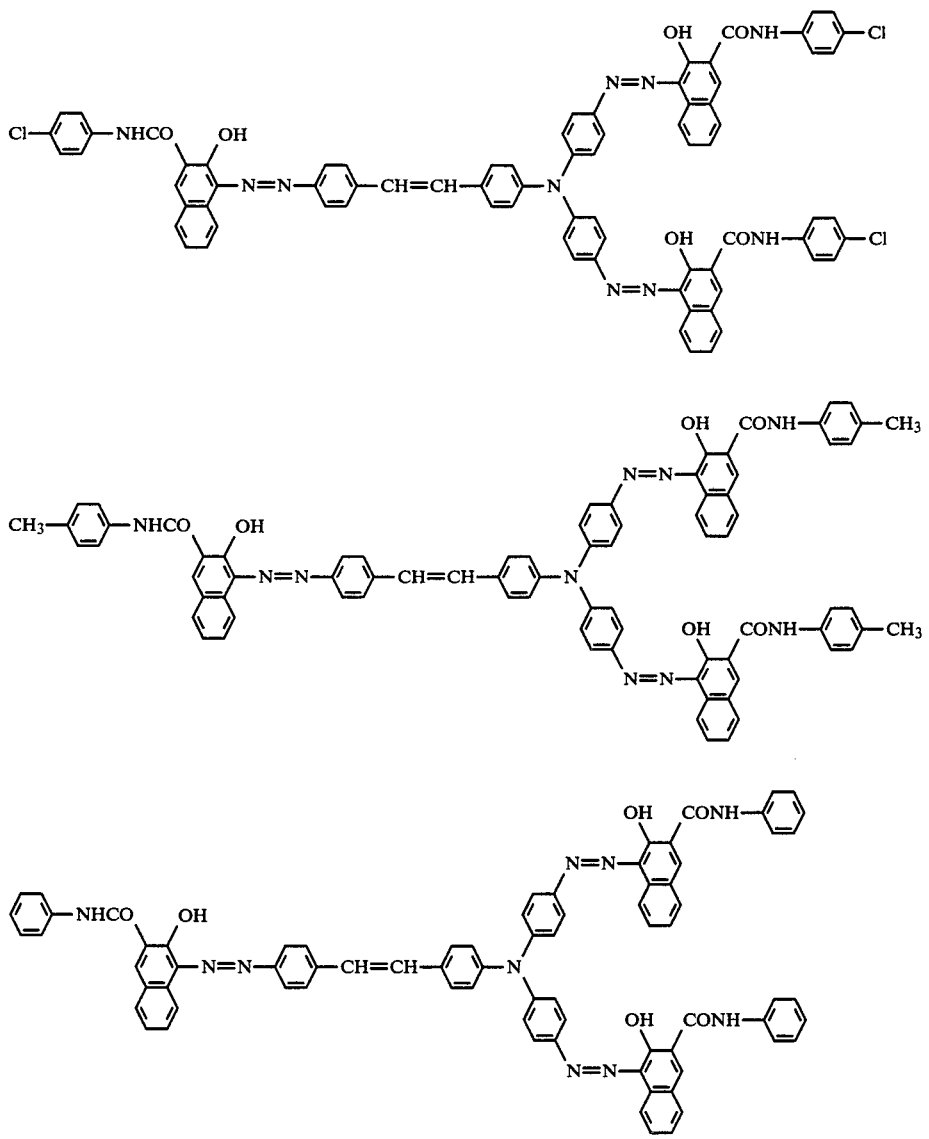

-continued
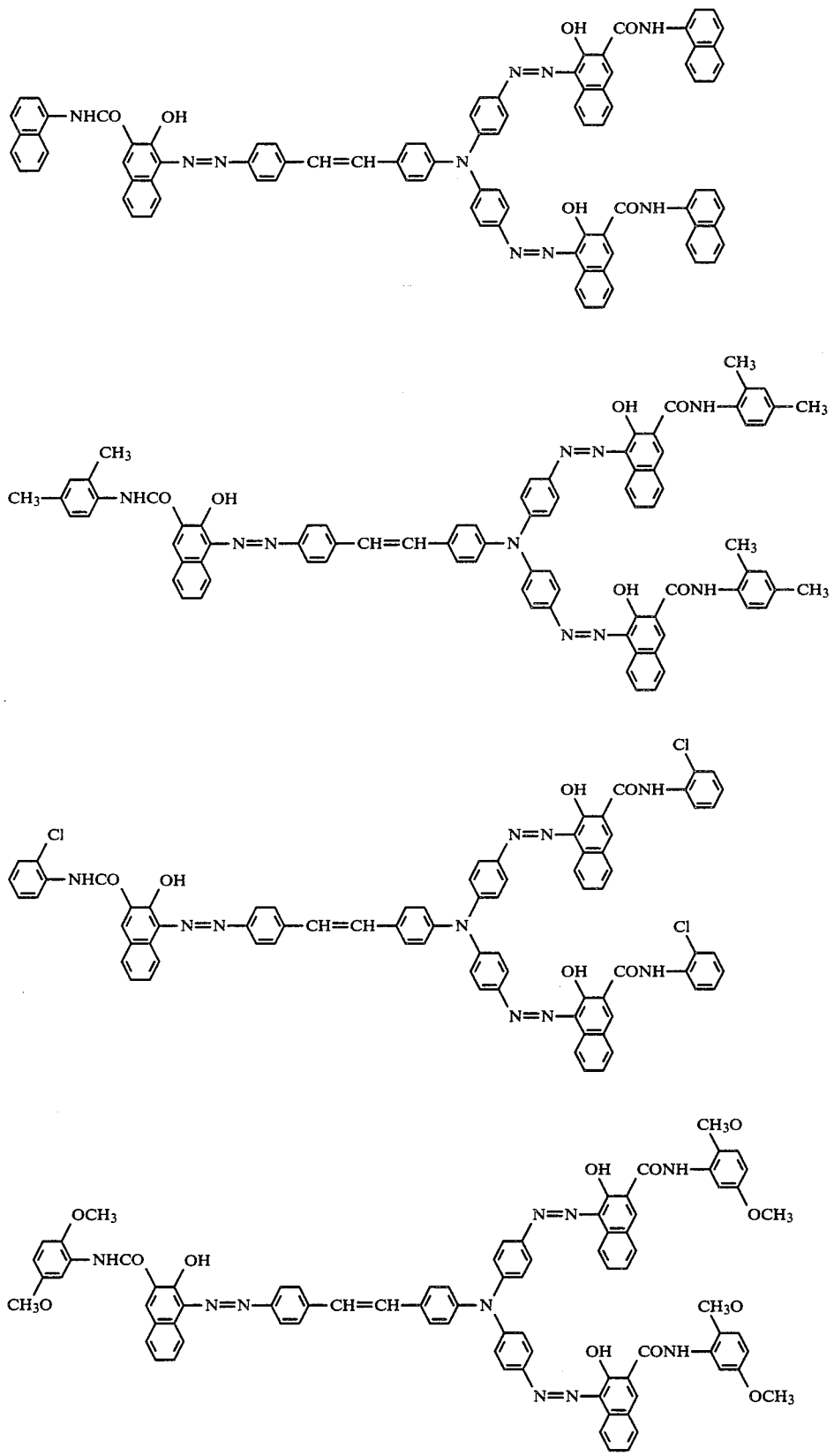

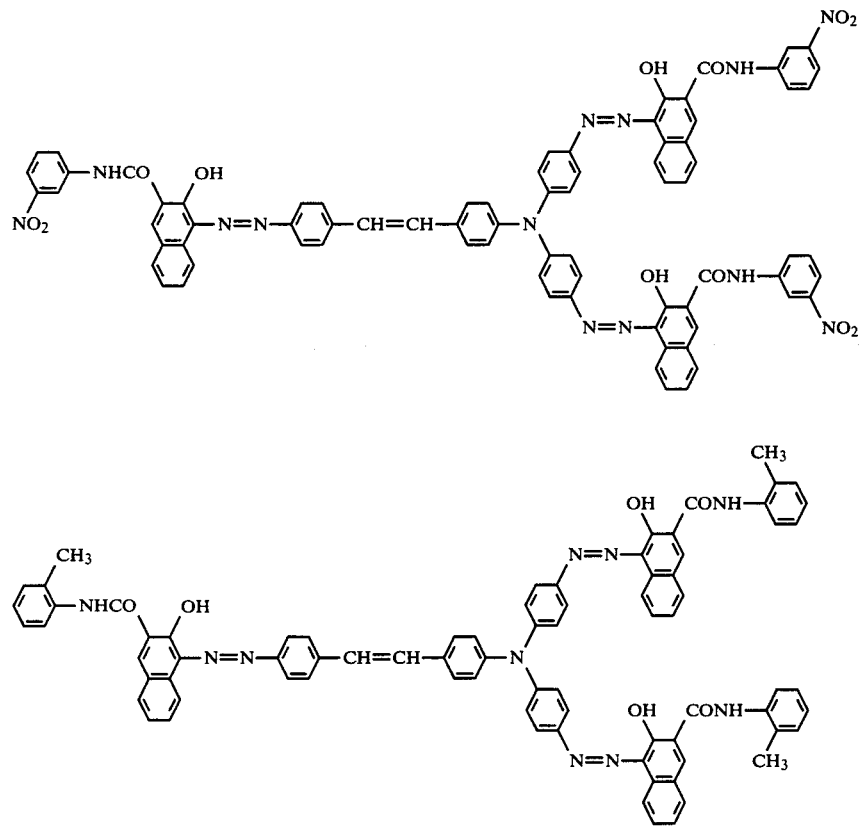
12. A photoreceptor according to claim 1, wherein said compound represented by formula (I) is selected from the group consisting of the following compounds:
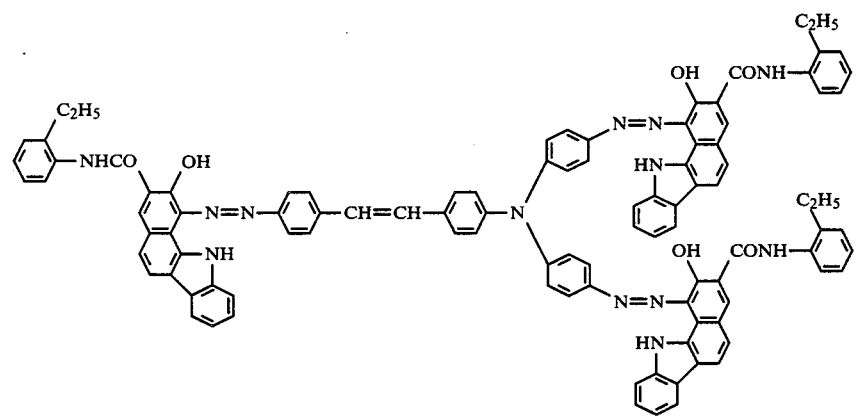

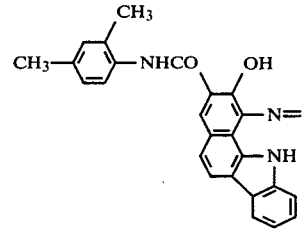 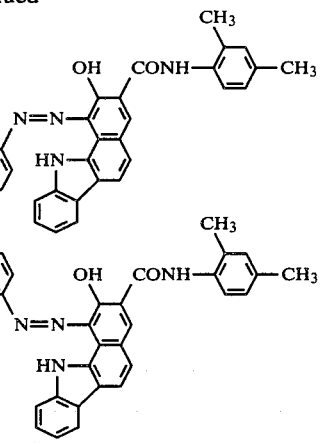

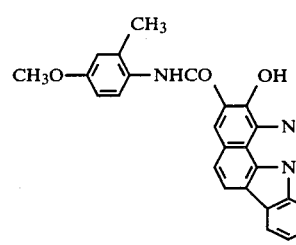 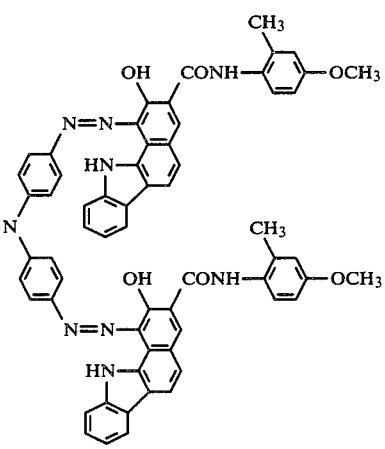

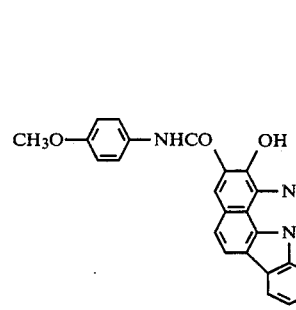 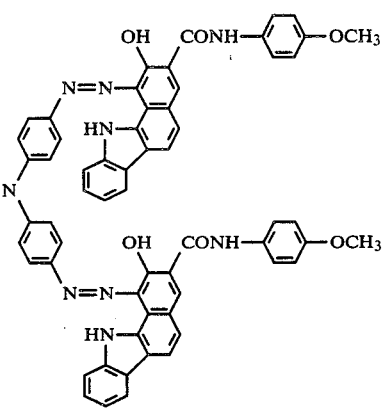

13. A photoreceptor according to claim 1, wherein said photosensitive layer contains a carrier generation material and a carrier transport material, said carrier generation material being a compound of said formula (I).

14. A photoreceptor according to claim 1, which comprises an electrically conductive support overlaid with a photosensitive layer consisting of carrier generation layer containing said compound of formula (I) and a carrier transport layer containing a carrier transport material, with or without an intermediate layer being provided between said support and said photosensitive layer.

* * * * *